United States Patent
Yang et al.

(10) Patent No.: US 9,635,248 B2
(45) Date of Patent: Apr. 25, 2017

(54) MOBILE DEVICE AND METHOD FOR CONTROLLING THE SAME

(71) Applicant: LG ELECTRONICS INC., Seoul (KR)

(72) Inventors: Jeonghwa Yang, Seoul (KR); Hyejin Bae, Uijeongbu-si (KR); Kyungha Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 14/682,586

(22) Filed: Apr. 9, 2015

(65) Prior Publication Data

US 2016/0191793 A1 Jun. 30, 2016

(30) Foreign Application Priority Data

Dec. 29, 2014 (KR) .......................... 10-2014-0191909

(51) Int. Cl.
*G05D 1/00* (2006.01)
*H04N 5/232* (2006.01)
(Continued)

(52) U.S. Cl.
CPC ......... *H04N 5/23222* (2013.01); *A63H 27/00* (2013.01); *A63H 30/04* (2013.01);
(Continued)

(58) Field of Classification Search
CPC ........ B64C 2201/123; B64C 2201/146; B64C 39/024; G05D 1/0022; G05D 1/0016;
(Continued)

(56) References Cited

U.S. PATENT DOCUMENTS 8,903,568 B1 12/2014 Wang et al.
2014/0008496 A1 1/2014 Zhou et al.
(Continued)

FOREIGN PATENT DOCUMENTS

KR 20-0331296 10/2003

OTHER PUBLICATIONS

PCT International Application No. PCT/KR2015/002095, Written Opinion of the International Searching Authority dated Sep. 25, 2015, 18 pages.

*Primary Examiner* — Dalena Tran
(74) *Attorney, Agent, or Firm* — Lee, Hong, Degerman, Kang & Waimey PC

(57) ABSTRACT

A mobile terminal and a method of controlling therefor are disclosed. The mobile terminal according to one embodiment of the present invention includes a touch interface module configured to receive a touch input, a communication module configured to establish communication with at least one or more drones and a controller configured to control the communication module and the touch interface module. The controller transmits location information of the mobile terminal to the drone with which the communication is established, designates a position of the drone based on the transmitted location information, receives a preview image obtained by a camera of the drone, displays the received preview image on a predetermined first area and if the touch input is recognized, captures the preview image displayed on the first area.

48 Claims, 58 Drawing Sheets

(51) Int. Cl.
    *H04W 4/02*          (2009.01)
    *A63H 30/04*         (2006.01)
    *A63H 27/00*         (2006.01)
    *G06F 3/0488*       (2013.01)

(52) U.S. Cl.
    CPC ......... *G05D 1/0016* (2013.01); *G05D 1/0038* (2013.01); *G06F 3/04883* (2013.01); *H04N 5/23203* (2013.01); *H04W 4/02* (2013.01)

(58) Field of Classification Search
    CPC .... G05D 1/0038; G05D 1/042; G05D 1/0808; G05D 1/10; G08C 17/02; H04M 1/04; H04M 1/72533; H04M 1/72575
    USPC ............................ 701/2; 345/173; 455/556.1
    See application file for complete search history.

(56) References Cited

U.S. PATENT DOCUMENTS

| | | | |
|---|---|---|---|
| 2014/0254896 A1 | 9/2014 | Zhou et al. | |
| 2014/0316614 A1 | 10/2014 | Newman | |
| 2016/0042637 A1* | 2/2016 | Cahill | G08B 25/10 701/3 |
| 2016/0078759 A1* | 3/2016 | Nerayoff | G06Q 20/145 701/3 |

\* cited by examiner

FIG. 7

| Touch drag of mobile terminal | Motion of drone |
|---|---|
| ↑ | Create command for raising altitude of drone |
| ↓ | Create command for lowering altitude of drone |
| ↺ | Create command for moving drone to touched point and then rotating drone in counterclockwise direction |
| | Create command for rotating drone in counterclockwise direction at current point |
| ↻ | Create command for moving drone to touched point and then rotating drone in clockwise direction |
| | Create command for rotating drone in clockwise direction at current point |
| ⋮ | ⋮ |

FIG. 17
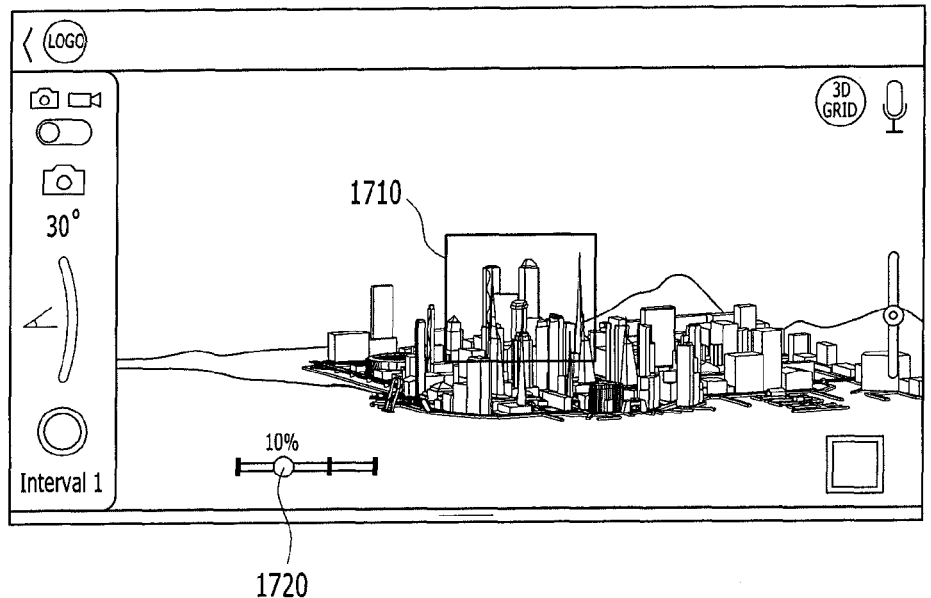
(a)
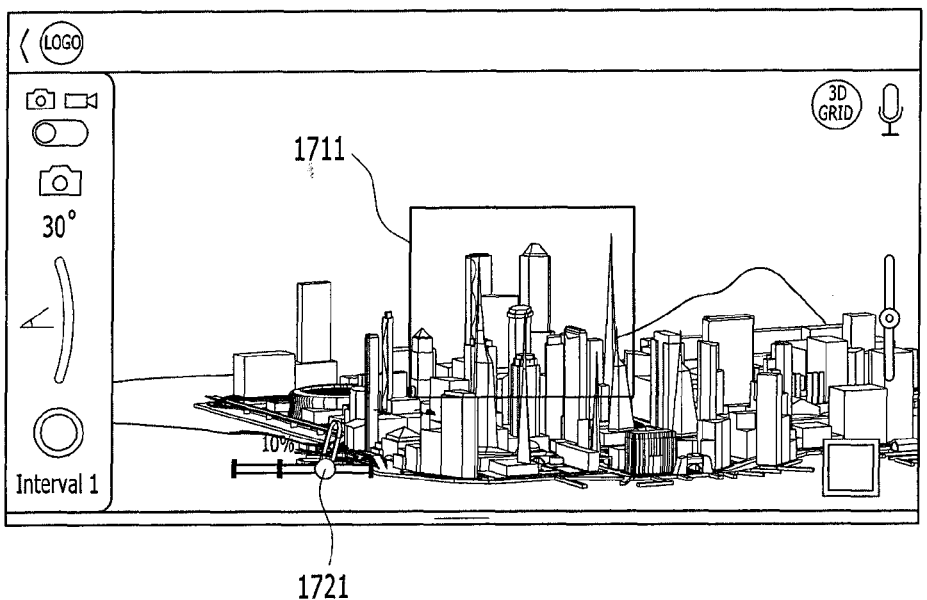
(b)

FIG. 24
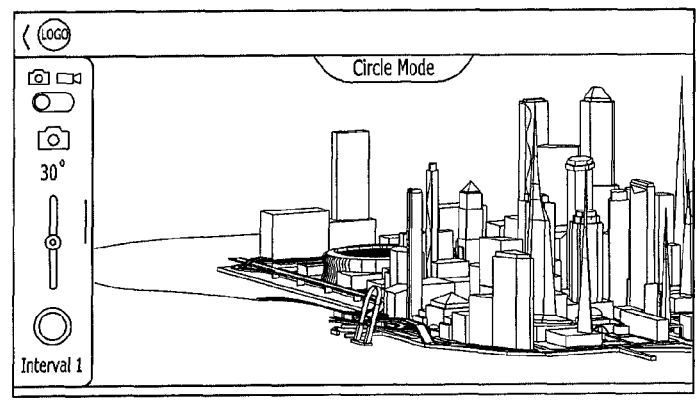
(a)
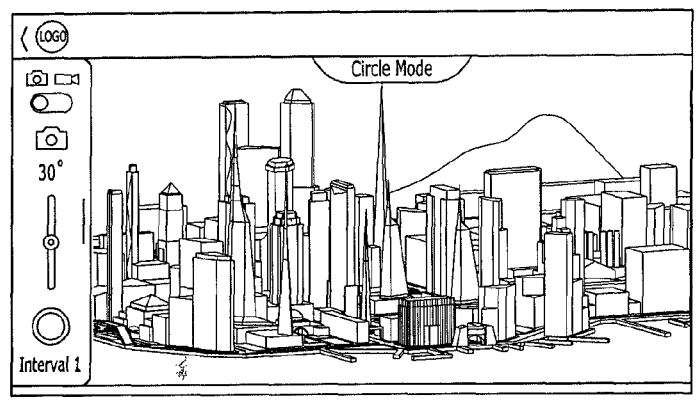
(b)
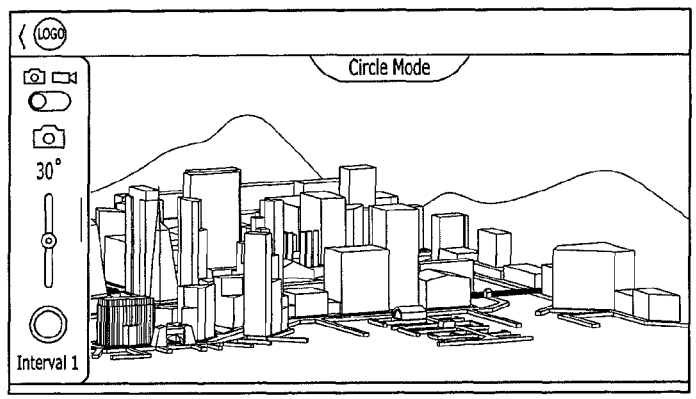
(c)

1. Share photo or video shot

3. Play if photos or videos uploaded by other people around.

4. Edit by copying GPS/Track coordinate value or apply it to my drone intactly.

MOBILE DEVICE AND METHOD FOR CONTROLLING THE SAME

Pursuant to 35 U.S.C. §119(a), this application claims the benefit of the Korean Patent Application No. 10-2014-0191909, filed on Dec. 29, 2014, the contents of which are hereby incorporated by reference herein in its entirety.

BACKGROUND OF THE INVENTION

Field of the Invention

The present invention relates to a mobile terminal and a method of controlling therefor. For instance, the present invention can be applied to all technologies capable of controlling a drone using the mobile terminal.

Discussion of the Related Art

Recently, a drone manageable by a person or a company is increasing. The drone means an unmanned flying object of a plane or a helicopter shape flying by a control signal of a radio wave. Yet, it is necessary to have a separate device to control the drone and the separate device may cause unnecessary cost.

SUMMARY OF THE INVENTION

Accordingly, the present invention is directed to an apparatus and method thereof that substantially obviate one or more problems due to limitations and disadvantages of the related art.

According to one embodiment of the present invention, an object of the present invention is to provide a solution capable of easily controlling a drone using a mobile terminal carried by most of users.

According to a different embodiment of the present invention, another object of the present invention is to propose a method of optimizing UX/UI necessary for controlling a drone in accordance with a mobile terminal.

According to a further different embodiment of the present invention, another object of the present invention is to propose a method of capturing a preview image via a camera of a mobile terminal after a drone automatically moves to a specific location.

According to a further different embodiment of the present invention, another object of the present invention is to provide a mobile terminal capable of controlling a drone via additional communication with the third device (e.g., a server or a different mobile terminal etc.).

Moreover, according to a further different embodiment of the present invention, another object of the present invention is to provide a technology more promptly controlling a camera of a mobile terminal and a camera of a drone at the same time.

According to a further different embodiment of the present invention, the other object of the present invention is to solve a problem of getting a phone call from an external mobile terminal in the course of controlling a drone using a mobile terminal.

Technical tasks obtainable from the present invention are non-limited the above mentioned technical tasks. And, other unmentioned technical tasks can be clearly understood from the following description by those having ordinary skill in the technical field to which the present invention pertains.

To achieve these objects and other advantages and in accordance with the purpose of the invention, as embodied and broadly described herein, according to one embodiment, a method of controlling a mobile terminal includes the steps of receiving a touch input, establishing communication with at least one or more drones, transmitting location information of the mobile terminal to the drone with which the communication is established, designating a position of the drone based on the transmitted location information and receiving a preview image obtained by a camera of the drone, displaying the received preview image on a predetermined first area and if the touch input is recognized, capturing the preview image displayed on the first area.

To further achieve these objects and other advantages and in accordance with the purpose of the invention, as embodied and broadly described herein, according to a different embodiment, a mobile terminal includes a touch interface module configured to receive a touch input, a communication module configured to establish communication with at least one or more drones and a controller configured to control the communication module and the touch interface module, the controller configured to transmit location information of the mobile terminal to the drone with which the communication is established, the controller configured to designate a position of the drone based on the transmitted location information and receive a preview image obtained by a camera of the drone, the controller configured to display the received preview image on a predetermined first area and the controller, if the touch input is recognized, configured to capture the preview image displayed on the first area.

Advantage and effectiveness of a mobile terminal according to the present invention and a method of controlling therefor are described in the following.

According to at least one of embodiments of the present invention, it is able to provide a solution capable of easily controlling a drone using a mobile terminal carried by most of users.

According to a different embodiment of the present invention, it is able to propose a method of optimizing UX/UI necessary for controlling a drone in accordance with a mobile terminal.

According to a further different embodiment of the present invention, it is able to propose a method of capturing a preview image via a camera of a mobile terminal after a drone automatically moves to a specific location.

According to a further different embodiment of the present invention, it is able to provide a mobile terminal capable of controlling a drone via additional communication with the third device (e.g., a server or a different mobile terminal etc.).

Moreover, according to a further different embodiment of the present invention, it is able to provide a technology more promptly controlling a camera of a mobile terminal and a camera of a drone at the same time.

According to a further different embodiment of the present invention, it is able to solve a problem of getting a phone call from an external mobile terminal in the course of controlling a drone using a mobile terminal.

An additional scope to which the present invention is applicable is to be clearly understood by following detail explanation. Yet, since various changes and modifications within an idea and a scope of the present invention can be clearly understood by those skilled in the art, detailed explanation and such a specific embodiment as a preferred embodiment of the present invention should be understood as just a given example.

BRIEF DESCRIPTION OF THE DRAWINGS

FIG. 7 is a diagram for one example of a database saved in a memory of a mobile terminal according to one embodiment of the present invention;

FIGS. 9 to 18 are diagrams to describe a $1^{st}$ mode for controlling a drone using a mobile terminal according to one embodiment of the present invention;

FIGS. 22 to 24 are diagrams to describe a 3rd mode for controlling a drone using a mobile terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
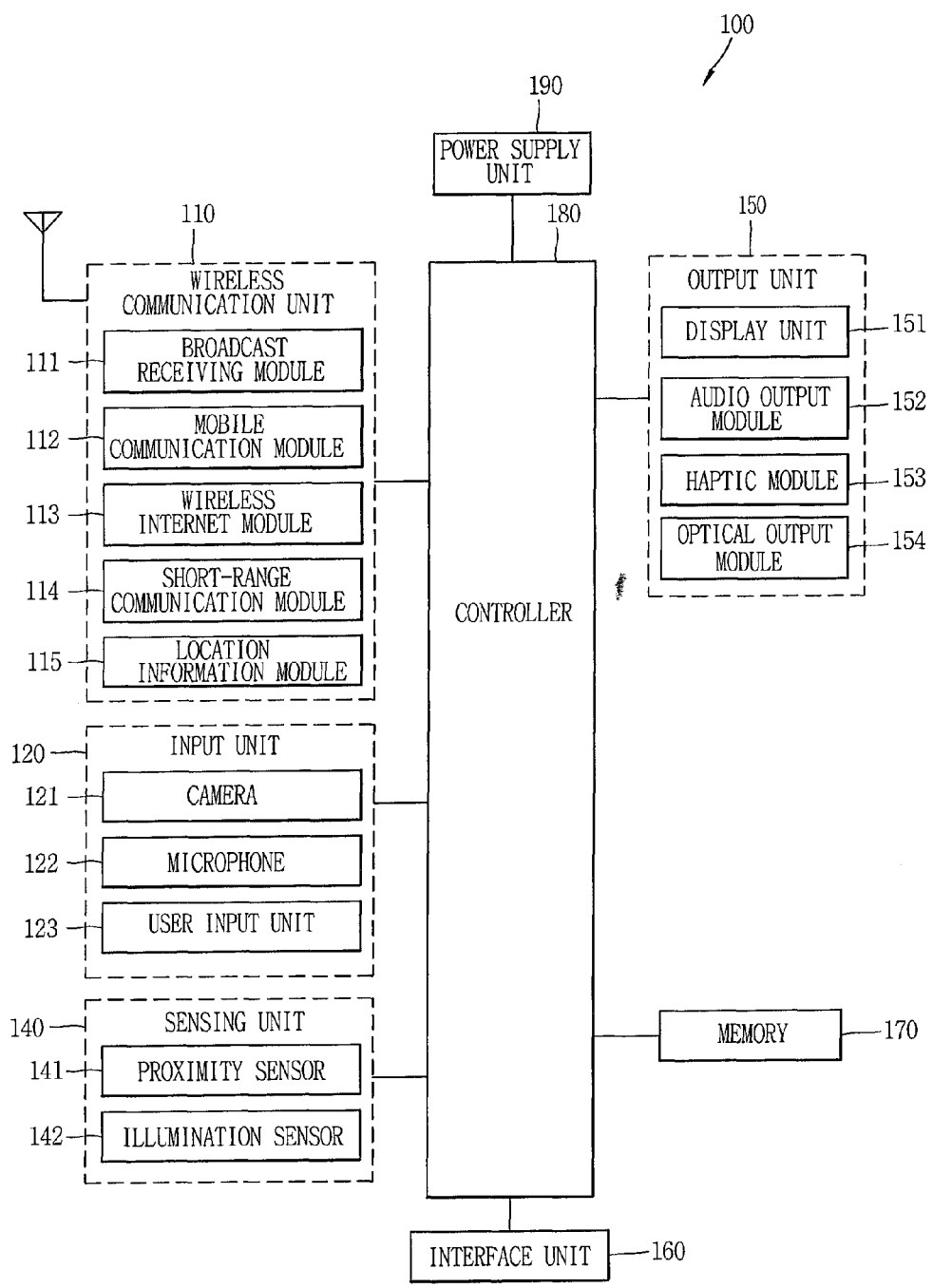
FIG. 1A is a block diagram of a mobile terminal in accordance with the present disclosure.
Figure 1B:
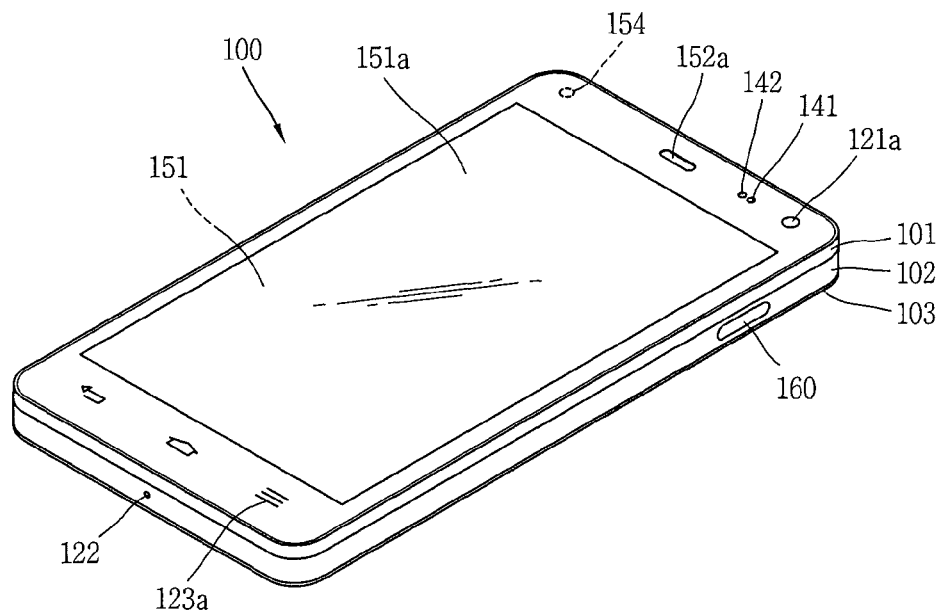
FIGS. 1B and 1C are conceptual views of one example of the mobile terminal, viewed from different directions.
Figure 1C:
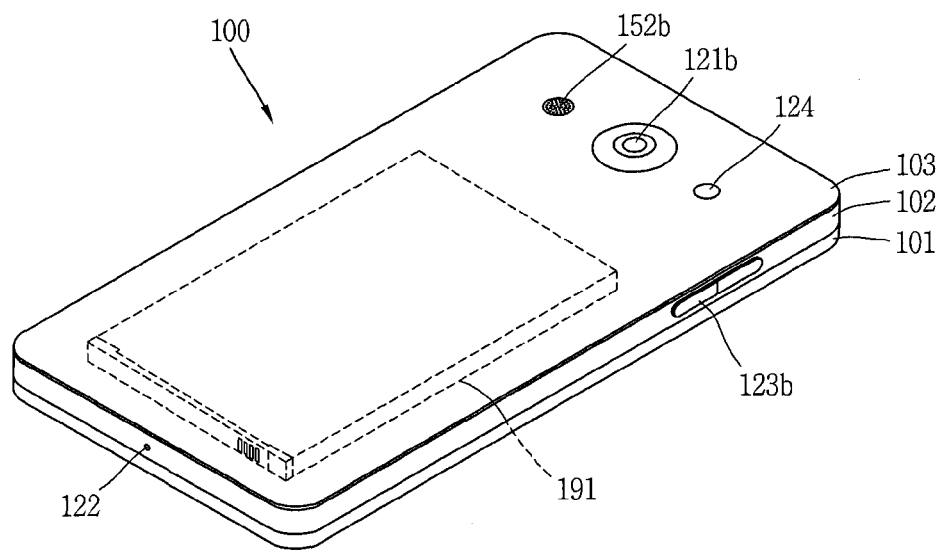

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
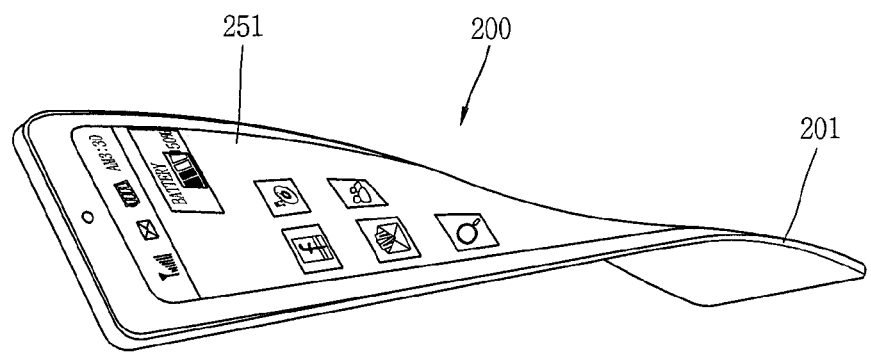
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
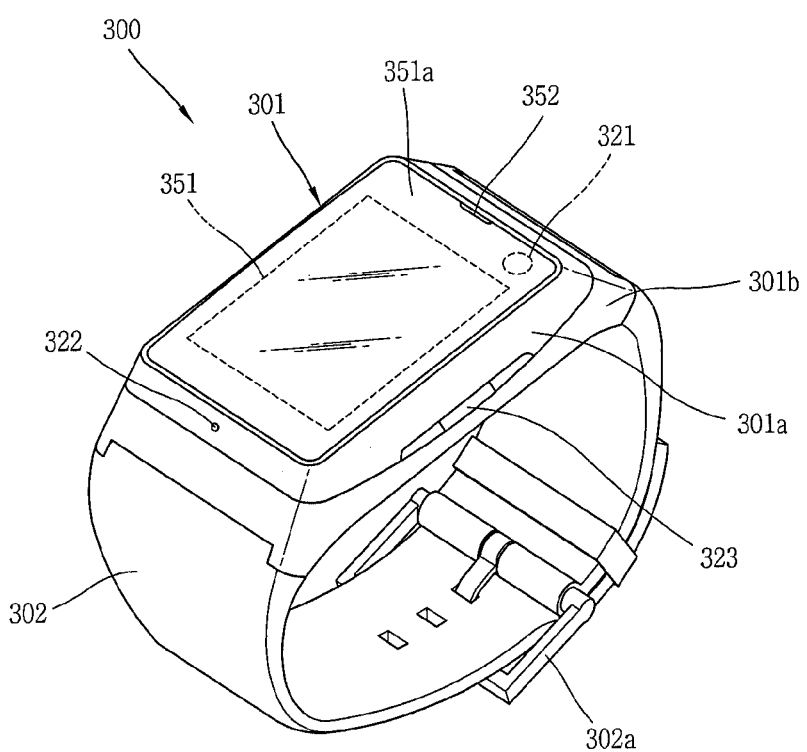
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
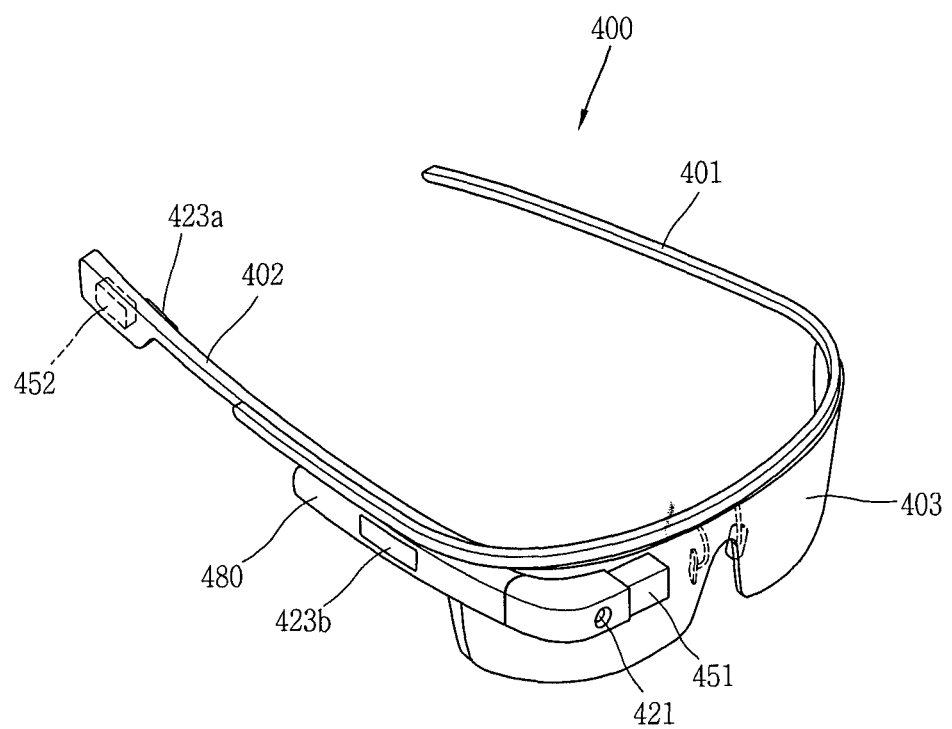
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Specifically, a mobile terminal configured to control a drone is described in detail with reference to FIGS. 5 to 34 as follows. Yet, with reference to FIGS. 1 to 4 mentioned in the foregoing description, FIGS. 5 to 34 can be supplementarily interpreted or the former embodiments shown in FIGS. 5 to 34 can be modified, by those skilled in the art to which the present invention pertains.

Figure 5:
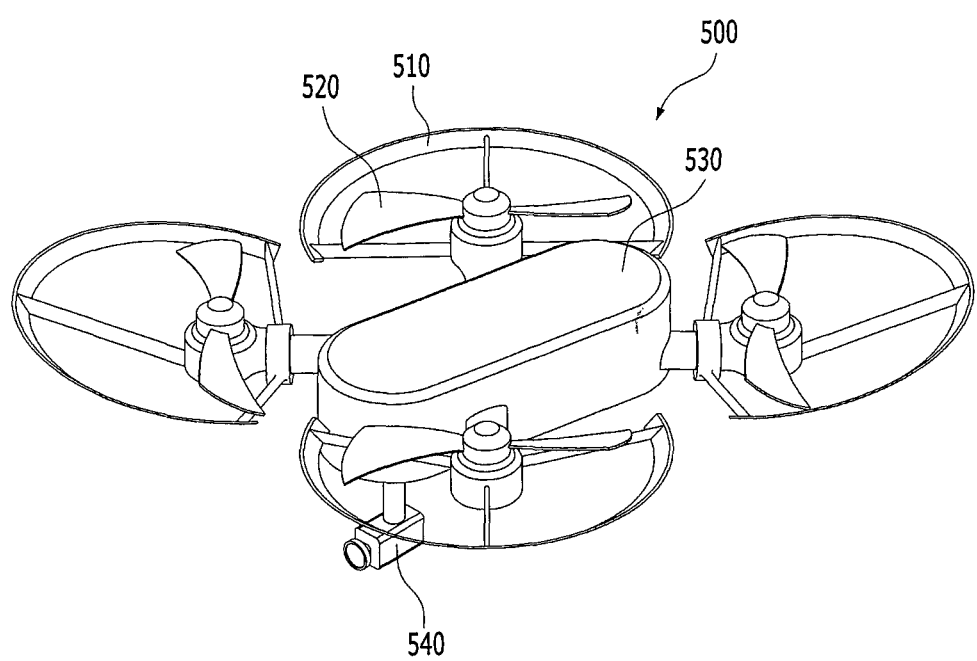
FIG. 5 is a diagram for one example of an exterior of a drone controlled by a mobile terminal according to one embodiment of the present invention.

FIG. 5 is a diagram for one example of an exterior of a drone controlled by a mobile terminal according to one embodiment of the present invention.

Referring to FIG. 5, a drone 500 may include a propeller guard 510, a propeller 520, a body 530, a camera 540 and the like. Yet, the scope of the appended claims and their equivalents of the present invention may be non-limited by the configuration of the drone 500 shown in FIG. 5. In particular, the present invention is applicable to drones of various types including a helicopter type (e.g., a tricopter with 3 propellers, a quadcopter with 4 propellers shown in FIG. 5, an octacopter with 8 propellers, etc.), an airplane type and the like.

The propeller guard 510 is configured to prevent a human or animal from being hurt by an operation of the propeller 520 and may be omitted. The propeller 520 and the camera 540 operate in response to a control signal of the body 530. And, a wireless communication module configured to communicate with a mobile terminal is included in the body 530. This is described in detail with reference to FIG. 6 as follows.

Figure 6:
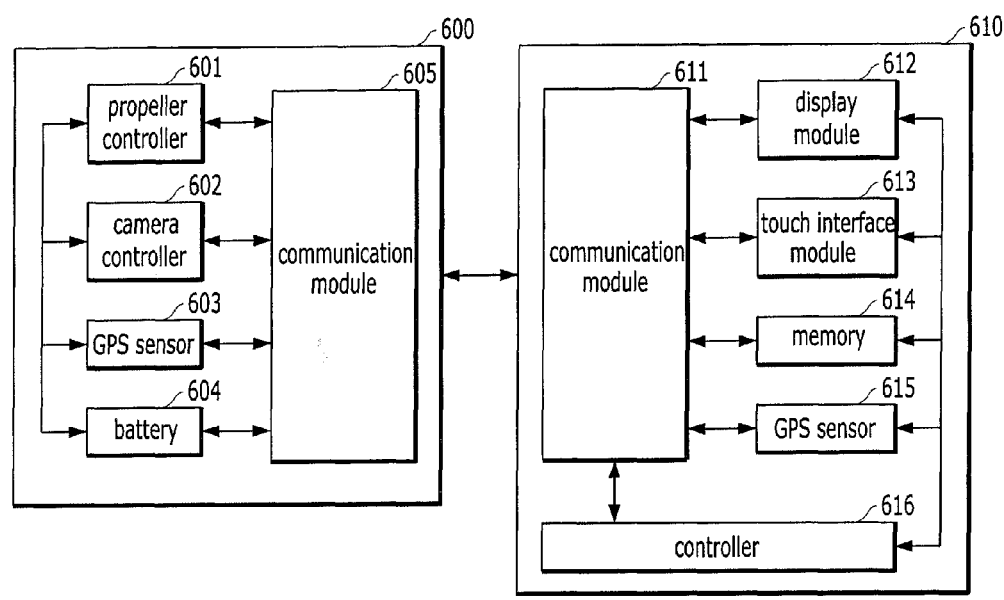
FIG. 6 is a block diagram of internal component modules of a drone and a mobile terminal according to one embodiment of the present invention.

FIG. 6 is a block diagram of internal component modules of a drone and a mobile terminal according to one embodiment of the present invention. A drone 600 shown in FIG. 6 can be supplementarily interpreted with reference to the former drone 500 shown in FIG. 5.

Referring to FIG. 6, a drone 600 and a mobile terminal 610 are designed to communicate with each other. To this end, the drone 600 includes a communication module 605. And, the mobile terminal 610 includes a communication module 611 as well. Moreover, both of the communication modules 605 and 611 are designed to use the same frequency. Particularly, command or control data generated by the mobile terminal 610 is delivered to the communication module 605 of the drone 600 through the communication module 611 of the mobile terminal 610.

A propeller controller 601 controls the propeller 520 shown in FIG. 5. A camera controller 502 controls the camera 540 shown in FIG. 5. Location information of the drone 600 detected through a GPS sensor 603 is shared with the mobile terminal 610. And, a battery 604 plays a role supplying a power necessary for each module. Moreover, the GPS sensor 603 means a sensor configured to precisely detect a location of a corresponding device using satellites. Yet, the present invention is non-limited by the GPS sensor. And, it is apparent to those skilled in the art that the GPS sensor can be replaced by a location information sensor of a different type capable of detecting a location of a corresponding device.

Besides, the drone 600 includes a ultrasonic sensor and an infrared sensor and is designed to prevent itself from colliding with neighboring objects [not shown in the drawing]. Of course, if a recognition of a front image is available through the camera controller 602, the ultrasonic sensor or the infrared sensor may be omitted.

Components of the mobile terminal 610 configured to control the above-described drone 600 are described in detail as follows.

First of all, referring to FIG. 6, the mobile terminal 610 may include a communication module 611, a display module 612, a touch interface module 613, a memory 614, a GPS sensor 615, a controller 616 and the like. Of course, deletion/addition/modification of the modules may belong to the scope of the appended claims and their equivalents of the present invention in part if necessary. And, the mobile terminal 610 shown in FIG. 6 can be supplementarily interpreted with reference to the former drawings mentioned in the foregoing description by those skilled in the art to which the present invention pertains.

The communication module 611 is designed to be capable of data transmission and reception to/from at least one drone 600. The display module 612 outputs a screen for controlling a motion of the drone 600.

The touch interface module 613 receives a random touch frag within the displayed or outputted screen. And, the controller 616 controls the communication module 611, the display module 612, the touch interface module 613 and the like.

If the received touch drag is recognized as applied in a 1st direction, the controller 616 generates a 1st control data for controlling an altitude of the drone. If the received touch drag is recognized as applied in a 2nd direction, the controller 616 generates a 2nd control data for controlling right and left directions of the drone 600.

According to another embodiment of the present invention, the controller 616 is designed to control the communication module 611 to transmit at least one of the generated 1st control data and the generated 2nd control data to the drone 600 and is also designed to receive video data shot through the camera of the drone 600. If a signal of selecting a random point within the displayed screen is received through the touch interface module 613, the controller 616 controls the communication module 611 to transmit a location information of an object corresponding to the point to the drone 600 and receives a video data including the object from the drone 600. If a touch drag of a circle type is received through the touch interface module 613, the memory 614 is designed to save at least two photos taken in accordance with a direction of the circle type as a single file. For instance, the screen includes a map containing a location of the mobile terminal 610.

According to further embodiment of the present invention, the display module 612 displays a specific location information in the map and at least one or more photos belonging to a preset range. In this case, the photo is characterized in being received from an external server.

According to further embodiment of the present invention, the controller 616 is designed to control the communication module 611 to extract a tag information of a specific photo selected from the at least one or more photos, to transmit the extracted tag information to the drone 600, and to receive a video data shot on the basis of the tag information from the drone 600. In this case, the tag information includes at least one of a GPS location information and a direction information of a taken photo for example.

FIG. 7 is a diagram for one example of a database saved in a memory of a mobile terminal according to one embodiment of the present invention. In order to change a motion of the drone in response to the touch drag described with reference to FIG. 6, it is necessary for a related database to be saved in a memory of a mobile terminal.

Referring to FIG. 7, if a touch drag in an up-direction is recognized in a mobile terminal, a command or control data for raising an altitude of a drone is generated. Subsequently, the generated command or control data is transmitted to the drone.

Moreover, if a touch drag in a down-direction is recognized in a mobile terminal, a command or control data for lowering an altitude of a drone is generated. Subsequently, the generated command or control data is transmitted to the drone.

On the other hand, if a touch drag in a counterclockwise direction is recognized in a mobile terminal, it is able to selectively generate commands of two types. Of course, an operation of mapping and saving a command of a single type belongs to the scope of the appended claims and their equivalents of the present invention. For instance, it is able to generate a command for moving a drone to a touched point and then rotating the drone in a counterclockwise direction or a command for rotating a drone in a counterclockwise direction at a current location of a drone.

Finally, if a touch drag in a clockwise direction is recognized in a mobile terminal, it is able to selectively generate commands of two types. Of course, an operation of mapping and saving a command of a single type belongs to the scope of the appended claims and their equivalents of the present invention. For instance, it is able to generate a command for moving a drone to a touched point and then rotating the drone in a clockwise direction or a command for rotating a drone in a clockwise direction at a current location of a drone.

Figure 8:
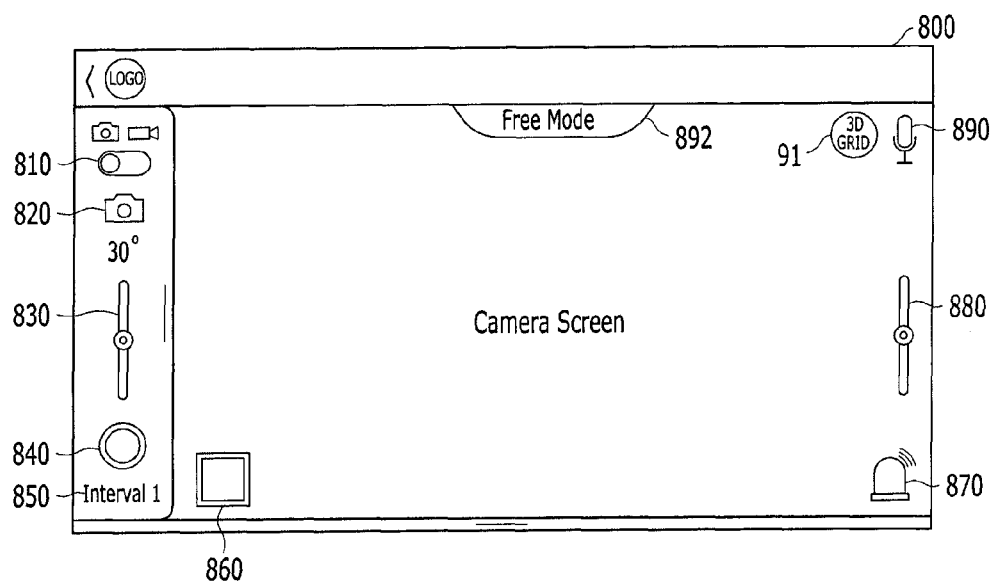
FIG. 8 is a diagram of a basic menu screen of a mobile terminal according to one embodiment of the present invention.

FIG. 8 is a diagram of a basic menu screen of a mobile terminal according to one embodiment of the present invention. It is possible to move a location of a drone or the like in response to a touch signal recognized from a screen of a mobile terminal shown in FIG. 8. Hence, it is unnecessary to produce a separate device.

Referring to FIG. 8, a mobile terminal 800 provides various options to control a drone. First of all, a 1st option 810 is an option to select a camera mode of the drone and is used to determine one of a photo taking mode and a video shooting mode.

A 2nd option 820 is used to change a direction of a camera installed on the drone. A 3rd option 830 is used to adjust a photographing angle of the camera installed on the drone. A 4th option 840 is used to generate a command at the moment of intending to take a photo in a screen currently shot by the drone. Particularly, the 4th option 840 may be named a shutter button.

When photos are consecutively taken in a screen currently shot by the drone, a 5th option 850 is used to determine an interval. A 6th option 860 is used to display a photo taken right before a last shot.

A 7th option 870 is related to an emergency for moving the drone to a location at which the mobile terminal is located. An 8th option 880 is used to adjust a moving speed of the drone.

A 9th option 890 is an option prepared to use a voice command to control the drone instead of using a touch signal. A 10th option 891 is used to switch a video data (shot by the drone) currently outputted through a screen of the mobile terminal 800 to a screen on a 3D map. And, an 11th option 892 is used to determine a mode for controlling the drone. Particularly, in the present specification, total 4 kinds of embodiments are proposed as the modes for controlling the drone. And, the respective modes are described in detail with reference to the accompanying drawings as follows.

FIGS. 9 to 18 are diagrams to describe a 1st mode for controlling a drone using a mobile terminal according to one embodiment of the present invention. In the following drawings, a term 'FREE MODE' is used instead of the 1st mode.

Referring to FIGS. 9 to 18, a free mode determines a moving direction of a drone by recognizing a user's touch drag signal.

Figure 9:
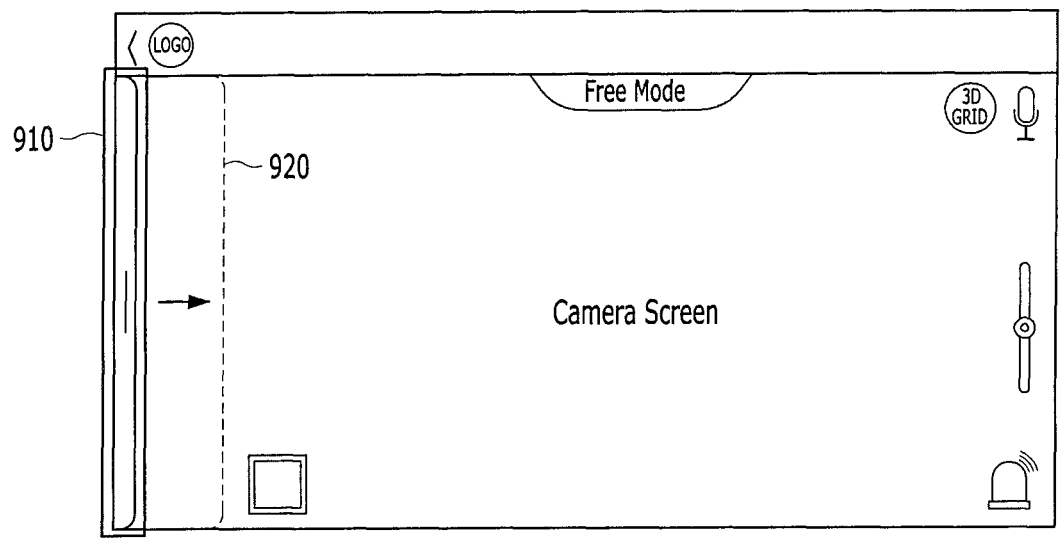

First of all, referring to FIG. 9, detailed options to control a drone in a 1st mode (i.e., free mode) may be hidden on a prescribed side 910 of a screen or can be displayed as an extended form 920 in accordance with user's necessity. The extended form 920 shown in FIG. 9 includes at least one of the options shown in FIG. 8.

Figure 10:
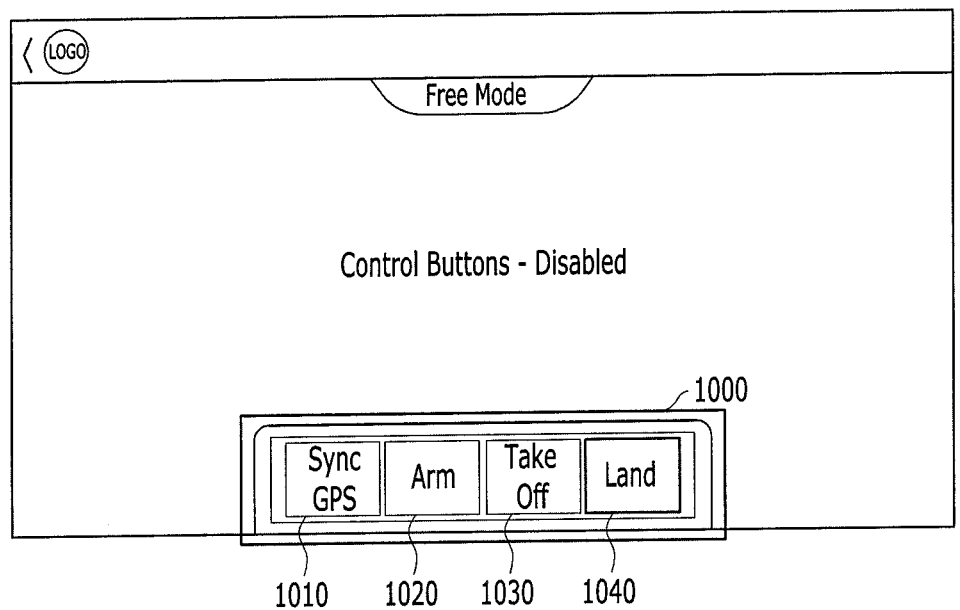

Meanwhile, referring to FIG. 10, basic options 1000 for controlling a drone are located on a bottom end of a mobile terminal. For instance, if a user moves a touch drag in a bottom-to-top direction, a drone launch menu 1000 is displayed. On the other hand, if a user moves a touch drag in a top-to-bottom direction, the drone launch menu 1000 disappears.

The drone launch menu 1000 includes 4 sub-options for example. A sync GPS related sub-option 1010 is used for a mobile terminal and a drone to share GPS information with each other. An arm related sub-option 1020 is used to control a guard of a propeller installed on the drone. A takeoff related sub-option 1030 is used to enable the drone to take off initially. A land related sub-option 1040 is used to enable the drone to land. Of course, the scope of the appended claims and their equivalents of the present invention is non-limited by the above-mentioned terms. And, the above-mentioned terms are available for other modes.

Figure 11:
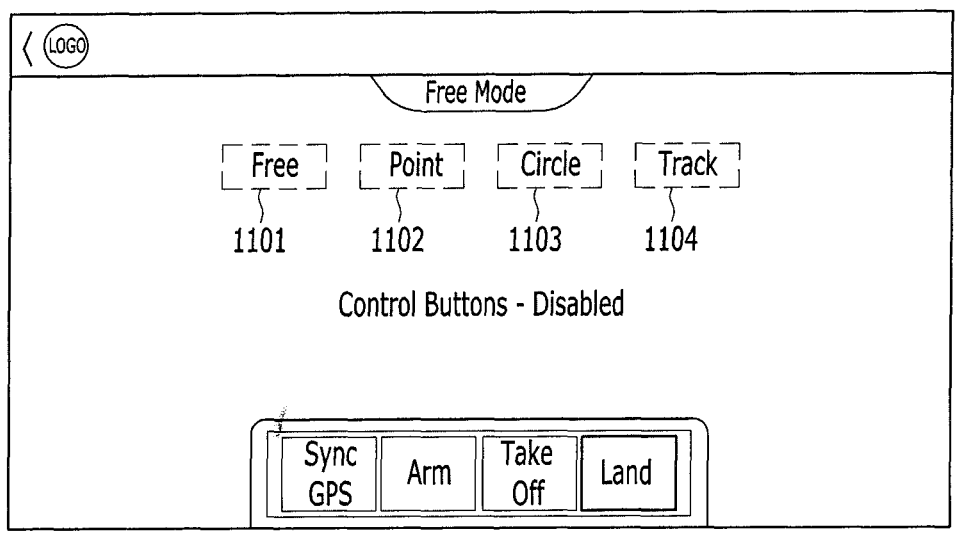

Referring to FIG. 11, a user is able to select 4 kinds of modes to control a drone. The 4 kinds of modes may include a free mode 1101, a point mode 1102, a circle mode 1103 and a track mode 1104. The point mode 1102 shall be described in detail with reference to FIGS. 19 to 21. The circle mode 1103 shall be described in detail with reference to FIGS. 22 to 24. And, the track mode 1104 shall be described in detail with reference to FIGS. 25 to 29.

Figure 12:
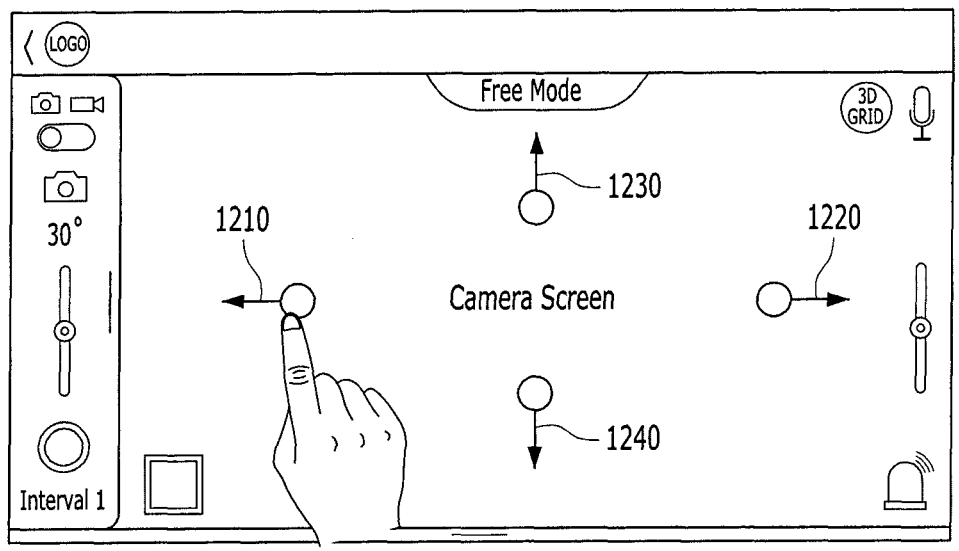

Referring to FIG. 12, in free mode, a moving direction of a drone is determined in response to a user's touch drag action. For instance, if a touch drag signal is recognized in a left direction 1210 on a screen of a mobile terminal, the mobile terminal transmits a command for moving the drone in the left direction to the drone.

Moreover, if a touch drag signal is recognized in a right direction 1220 on a screen of a mobile terminal, the mobile terminal transmits a command for moving the drone in the right direction to the drone.

Meanwhile, if a touch drag signal is recognized in a top direction 1230 on a screen of a mobile terminal, the mobile terminal transmits a command for moving the drone in the top direction (to raise an altitude) to the drone. If a touch drag signal is recognized in a bottom direction 1240 on a screen of a mobile terminal, the mobile terminal transmits a command for moving the drone in the bottom direction (to lower an altitude) to the drone.

Figure 13:
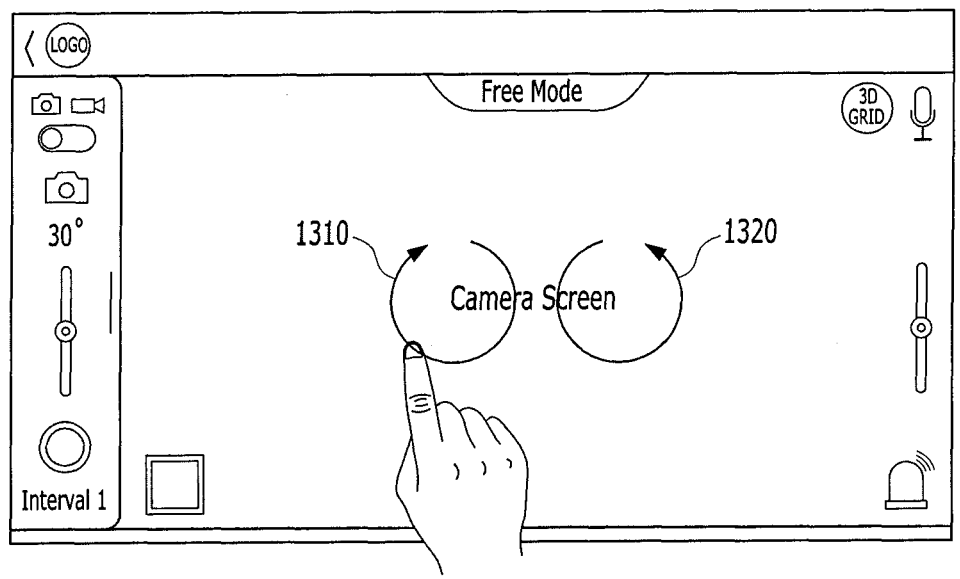
Figure 14:
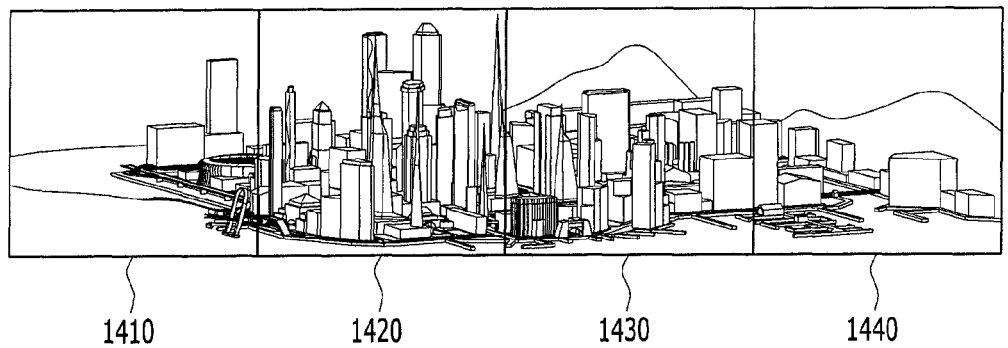

Unlike FIG. 12, FIG. 13 shows one embodiment for determining a rotational direction of a drone. For instance, referring to FIG. 13, if a touch drag signal rotating in a clockwise direction 1310 on a screen of a mobile terminal is recognized, the mobile terminal transmits a command for rotating the drone in the clockwise direction to the drone.

On the other hand, if a touch drag signal rotating in a counterclockwise direction 1320 on a screen of a mobile terminal is recognized, the mobile terminal transmits a command for rotating the drone in the counterclockwise direction to the drone. Besides, referring to FIG. 14, the drone is designed to save images taken by rotating at 360 degrees in a panoramic view in a memory or to transmit the images to a mobile terminal Particularly, 1st to 4th images 1410, 1420, 1430 and 1440 correspond to images taken at different angles at the same altitude, respectively.

Figure 15:
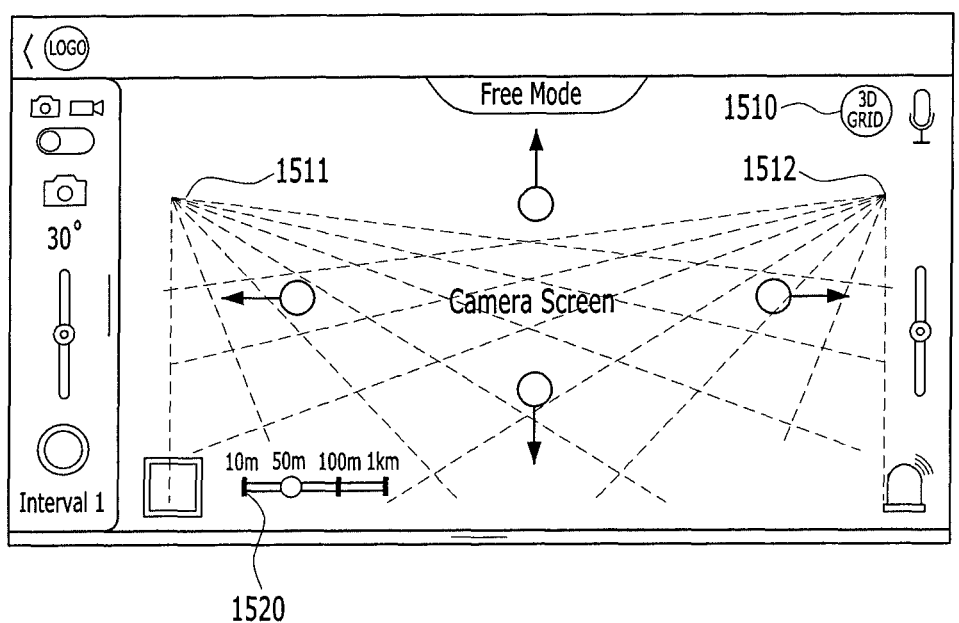

FIG. 15 shows a 3D grid guide line. For instance, if a specific option 1510 shown in FIG. 15 is selected, a screen taken by a drone is outputted through a 3D map. If the specific option 1510 is selected again, the screen taken by the drone is outputted through a 2D map. In particular, as a 3D grid map is created and outputted with reference to two reference points 1511 and 1512, it is advantageous in that a view captured by a camera of the drone can be more elaborately adjusted by a user.

Moreover, if a random point or a specific point is touched over a predetermined time, as shown in FIG. 15, an indicator 1520 for adjusting a distance unit on the 3D map is additionally displayed.

In the former drawings, a touch drag is assumed as a command for adjusting a location of a drone in free mode. On the other hand, in FIG. 16, in order to move a drone to a specific location, a pinch-out touch signal is assumed instead of a touch drag.

Figure 16:
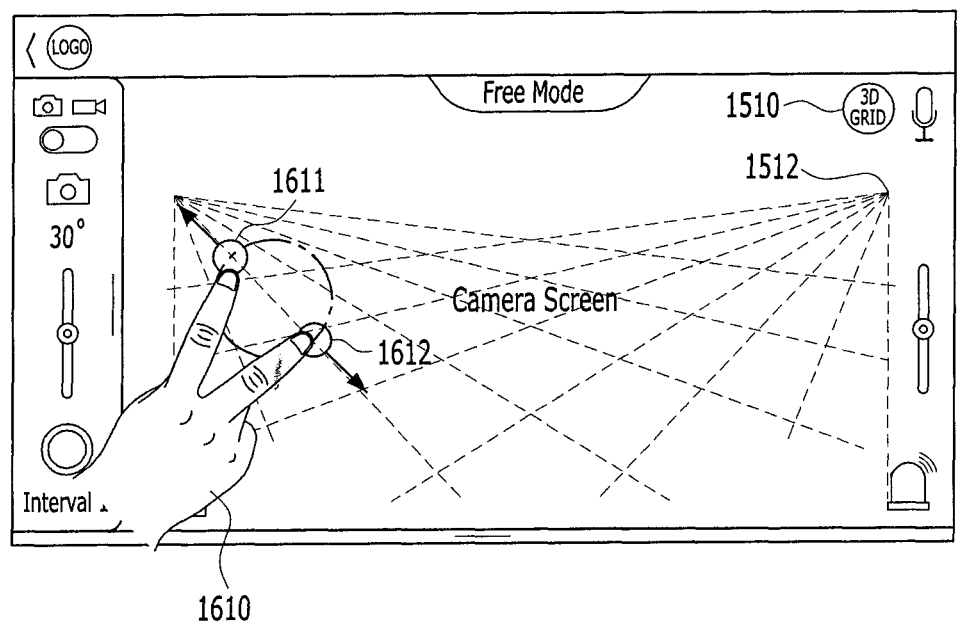

For instance, referring to FIG. 16, if a user applies a drag in an internal direction while simultaneously touching two points 1611 and 1622 (such action is generally called a pinch-out action), a command for moving a drone to a center point between the two points 1611 and 1612 is automatically generated and then transmitted to the drone. Yet, FIG. 16 assumes the 3D grid guide line shown in FIG. 15, by which the present invention is non-limited.

According to another embodiment of the present invention, it is designed to change a photograph mode depending on a user's touch gesture. For instance, if the circle type touch gesture 1310/1320 shown in FIG. 13 is recognized from a preview screen outputted by a mobile device, a panoramic photograph mode is automatically entered [cf. FIG. 14]. On the other hand, if the pinch-in/out type touch gesture 1611 and 1612 shown in FIG. 16 is recognized from a preview screen outputted by a mobile device, a burst photograph mode is automatically entered. In this case, the burst photograph mode corresponds to a function of taking pictures consecutively in a predetermined time interval.

FIG. 17 assumes a case that a landmark can be automatically recognized by a mobile terminal or a drone.

Referring to FIG. 17, if a specific landmark 1710 is included in a video currently shot by a drone [FIG. 17 (a)], it is designed that the specific landmark 1720 is shot by enlargement [FIG. 17 (b)]. In particular, assuming that a magnification of the video shot in FIG. 17 (a) is 10% 1720, a magnification of the video shot in FIG. 17 (b) is enlarged into 20% 1721. In particular, it means that the specific landmark is shot in an enlarged state.

Moreover, it is possible to design that a subject corresponding to a landmark shown in FIG. 17 is always outputted through a screen of a mobile terminal. For instance, if it is designed for a drone to shoot a subject by rotating around the subject, it may belong to another scope of the appended claims and their equivalents of the present invention.

Figure 18:
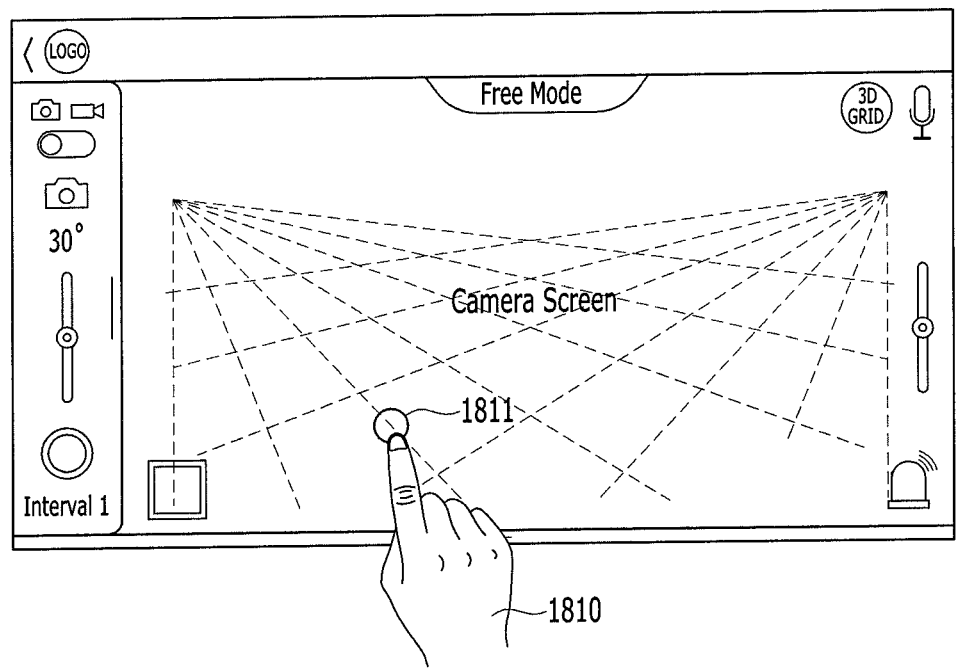

FIG. 18 shows a process for generating a command for pausing a drone in free mode.

Referring to FIG. 18, if a user 1810 touches a screen 1811 of a mobile terminal currently outputting an image taken by a drone, a command for pausing a movement of the drone is generated and transmitted to the drone. Moreover, if a 2nd touch is applied, a command for resuming a movement of the drone is generated and transmitted to the drone. Of course, a touch point of the initial touch does not need to be identical to that of the 2nd touch. Hence, it is advantageous in that a user does not need to return to a complicated menu screen.

Meanwhile, in the present specification, the 1st to 4th modes are separately described. And, it is apparent that an operation for one mode to adopt a specific function mentioned in the description of another mode belongs to another scope of the appended claims and their equivalents of the present invention.

Figure 19:
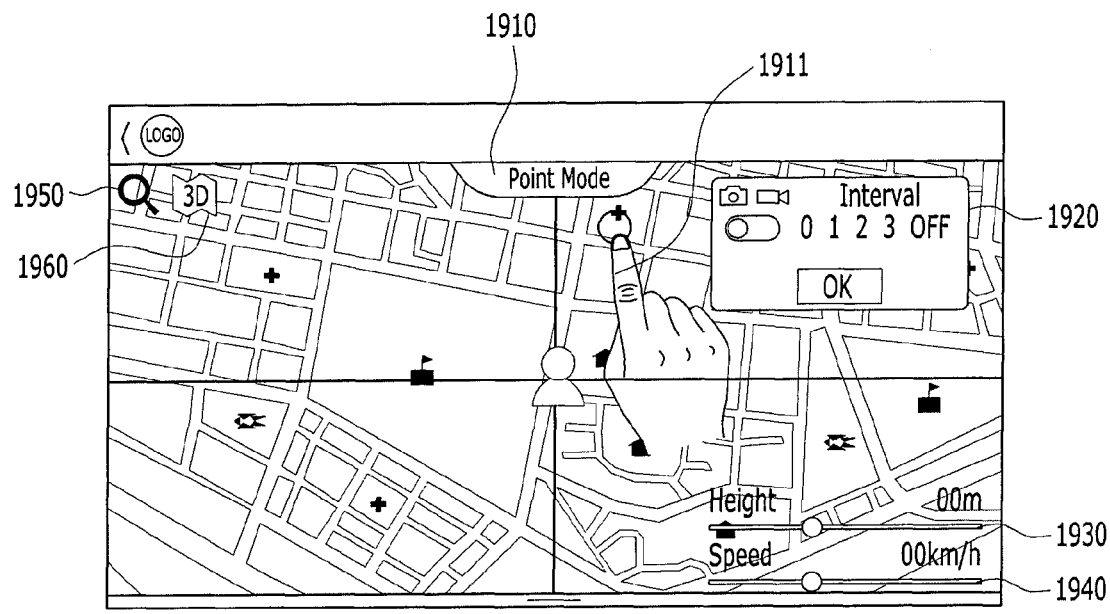
FIGS. 19 to 21 are diagrams to describe a $2^{nd}$ mode for controlling a drone using a mobile terminal according to one embodiment of the present invention.
Figure 20:
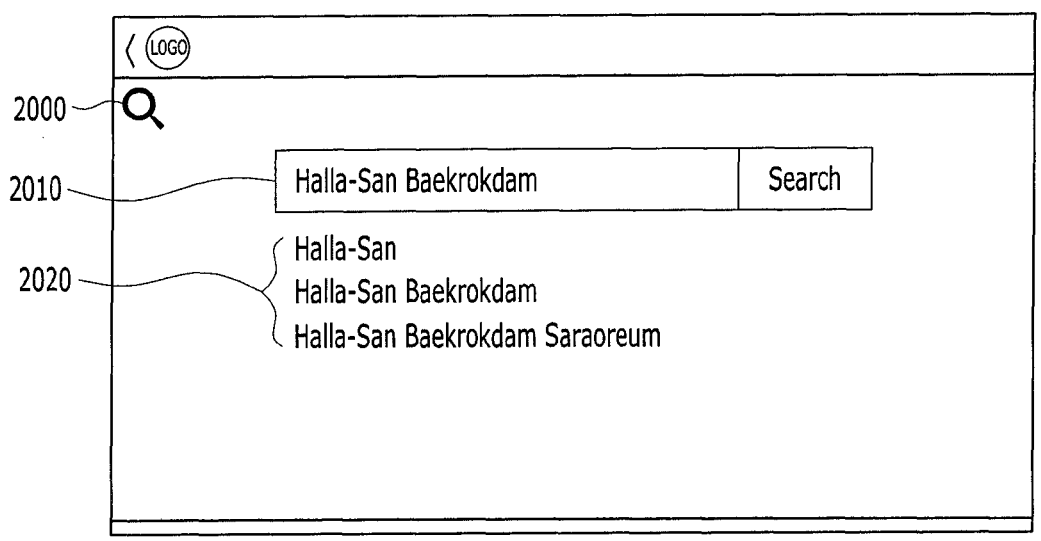
Figure 21:
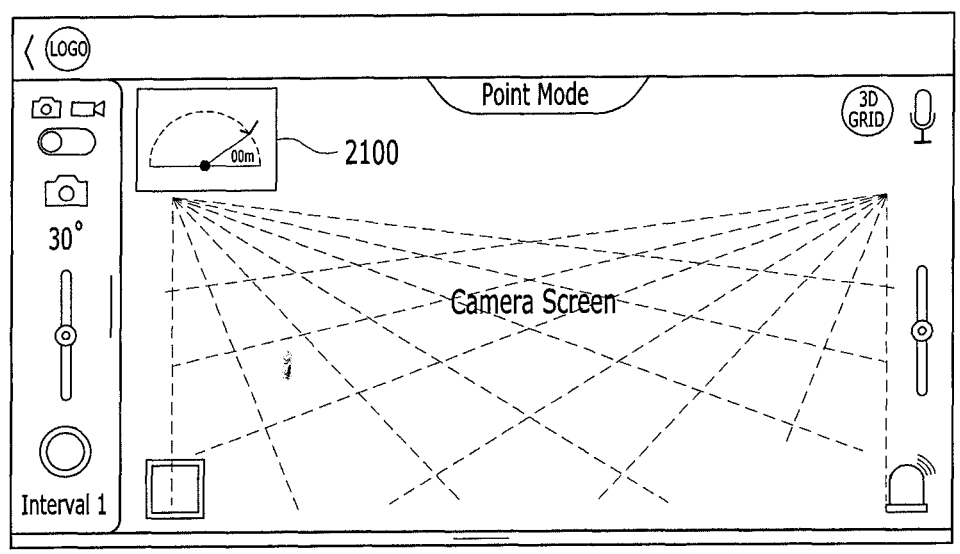

FIGS. 19 to 21 are diagrams to describe a 2nd mode for controlling a drone using a mobile terminal according to one embodiment of the present invention. Yet, in the drawings, a term 'PONT MODE' is used instead of a 2nd mode. In the description with reference to FIGS. 19 to 21, unlike the aforementioned 1st mode (i.e., free mode), a point mode determines a moving direction of a drone just in response to a user's touch to a specific point.

Referring to FIG. 19, a screen 1910 includes a map around a mobile terminal. In doing so, if a user touches a specific point 1911 on the map, a drone moves to the specific point 1911. For instance, the mobile terminal transmits a GPS value corresponding to the selected specific point 1911 to the drone. Hence, it is advantageous in that the user does not need to input a moving distance or GPS information of the specific point 1911 one by one.

Moreover, referring to FIG. 19, a 1st menu option 1920 is used to set a time unit for taking photos consecutively through a camera of the drone, a 2nd menu option 1930 corresponds to a graphic image indicating an altitude (i.e., height) of the drone, and a 3rd menu option 1940 corresponds to a graphic image indicating a speed of the drone. Of course, a design for a user to adjust the 2nd menu option 1930 and the 3rd menu option 1940 belongs to another scope of the appended claims and their equivalents of the present invention.

Meanwhile, a 4th menu option 1960 is used to switch to a 3D map format.

If a 5th menu option 1950 is selected, destinations to which the drone can move are outputted as a list. For instance, the outputted destinations may include major tourist attractions and the like around a current location of a mobile terminal. This is described in detail with reference to FIG. 20 as follows.

Referring to FIG. 20, an option for searching major places around a current location of a mobile terminal or a drone is provided in point mode. For instance, if a specific indicator 2000 shown in FIG. 20 is selected, a window 2101 for inputting a search word thereto is displayed.

If a specific keyword is inputted to the window 2010, a list of major tourist attractions related to the corresponding keyword is outputted. Particularly, the list 2020 may be limitedly designed in a manner of being located within a preset distance from a drone or mobile terminal located point. This is the design in consideration of a moving distance of the drone.

Referring to FIG. 21, a point mode provides a mini status screen. In particular, the mini status screen 2100 shown in FIG. 21 is displayed at a preset location, which is variable, within a screen of a mobile terminal and indicates such real-time information of a drone as a moving path, a speed, an altitude and the like. Moreover, if the mini status screen 2100 is touched, it is designed that detailed options for changing a moving path of the drone are displayed, which belongs to another scope of the appended claims and their equivalents of the present invention.

Figure 22:
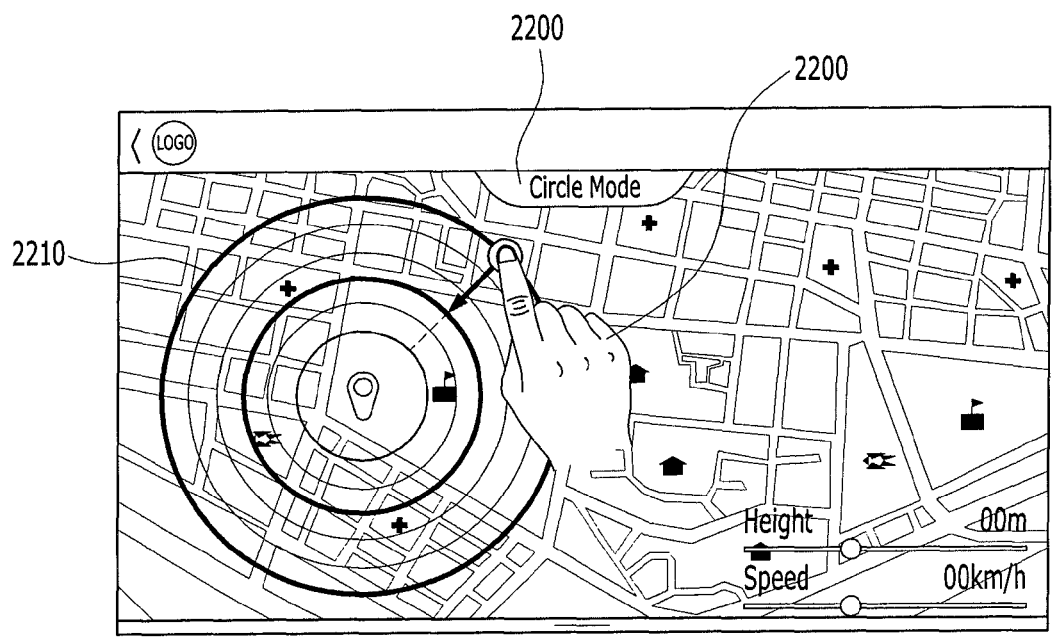
Figure 23:
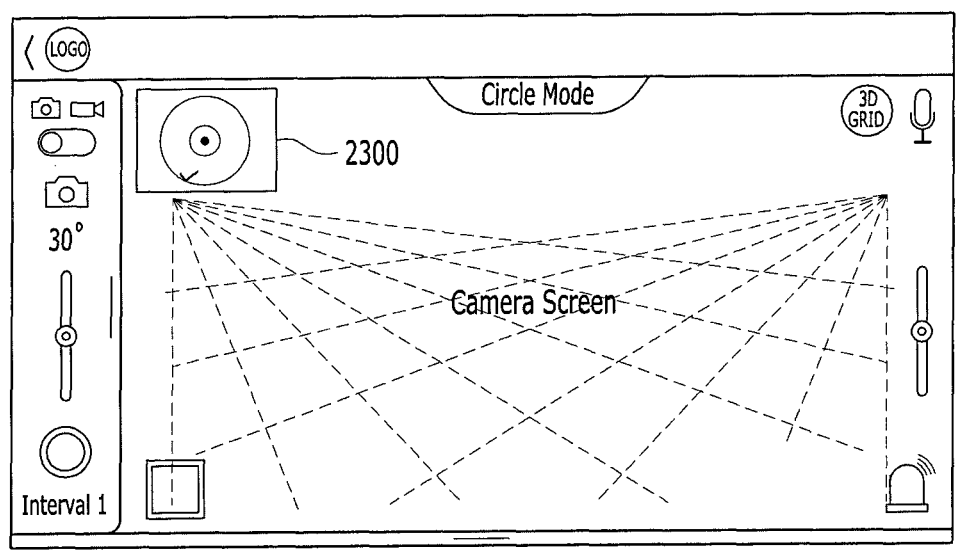

FIGS. 22 to 24 are diagrams to describe a 3rd mode for controlling a drone using a mobile terminal according to one embodiment of the present invention. Yet, in the drawings, a term 'CIRCLE MODE' is used instead of a 3rd mode. Unlike the aforementioned 1st or 2nd mode, the circle mode determines a moving path of a drone, as shown in FIGS. 22 to 24, in a manner that a user touches a specific circle line and then applies a drag.

First of all, referring to FIG. 22, if a circle mode 2200 is selected, a circle 2210 is displayed centering on a current location of a mobile terminal or a drone. In doing so, a user 2200 determines a moving path of the drone by selecting and then dragging a specific circle. For instance, the drone is designed to circle round in accordance with the selected radius value, which belongs to another scope of the appended claims and their equivalents of the present invention.

Moreover, referring to FIG. 23, a circle mode is designed to display a mini status screen 2300 at a specific location of a mobile terminal as well. The mini status screen 2300 displays a moving speed of a drone, a speed of the drone and the like by real time. Moreover, if the mini status screen 2300 is touched, it is designed that detailed options for changing a moving path of the drone are displayed, which belongs to another scope of the appended claims and their equivalents of the present invention.

FIG. 24 shows an auto panoramic photo mode provided by a circle mode. In particular, a 1st image shown in FIG. 24 (*a*) corresponds to an image data of a specific point taken at a 1st angle, a 2nd image shown in FIG. 24 (*b*) corresponds to an image data of a specific point taken at a 2nd angle, and a 3rd image shown in FIG. 24 (*c*) corresponds to an image data of a specific point taken at a 3rd angle. The taken images shown in FIGS. 24 (*a*) to 24 (*c*) are saved as a single panoramic photo in a memory of a drone or a mobile terminal. Particularly, if a user does not establish special settings in circle mode, it is designed to operate in the panoramic photo mode shown in FIG. 24.

FIGS. 25 to 29 are diagrams to describe a 4th mode for controlling a drone using a mobile terminal according to one embodiment of the present invention. Yet, in the drawings, a term 'TRACK MODE' is used instead of a 4th mode. Unlike the aforementioned 3 kinds of modes, it is advantageous in that a track mode enables a user to quickly select at least two paths, as shown in FIGS. 25 to 29.

In particular, according to a track mode mentioned in the following description, a user can set a path of a drone in advance by selecting at least two points from a grid on a map. In more particular, it is advantageous in that a camera mode to be activated in the drone can be individually selected per interval in advance. For instance, a photograph mode (for shooting a photo or video), an interval of a photo taking, a presence or non-presence of a curved driving or a straight driving and the like can be set up in advance.

Figure 25:
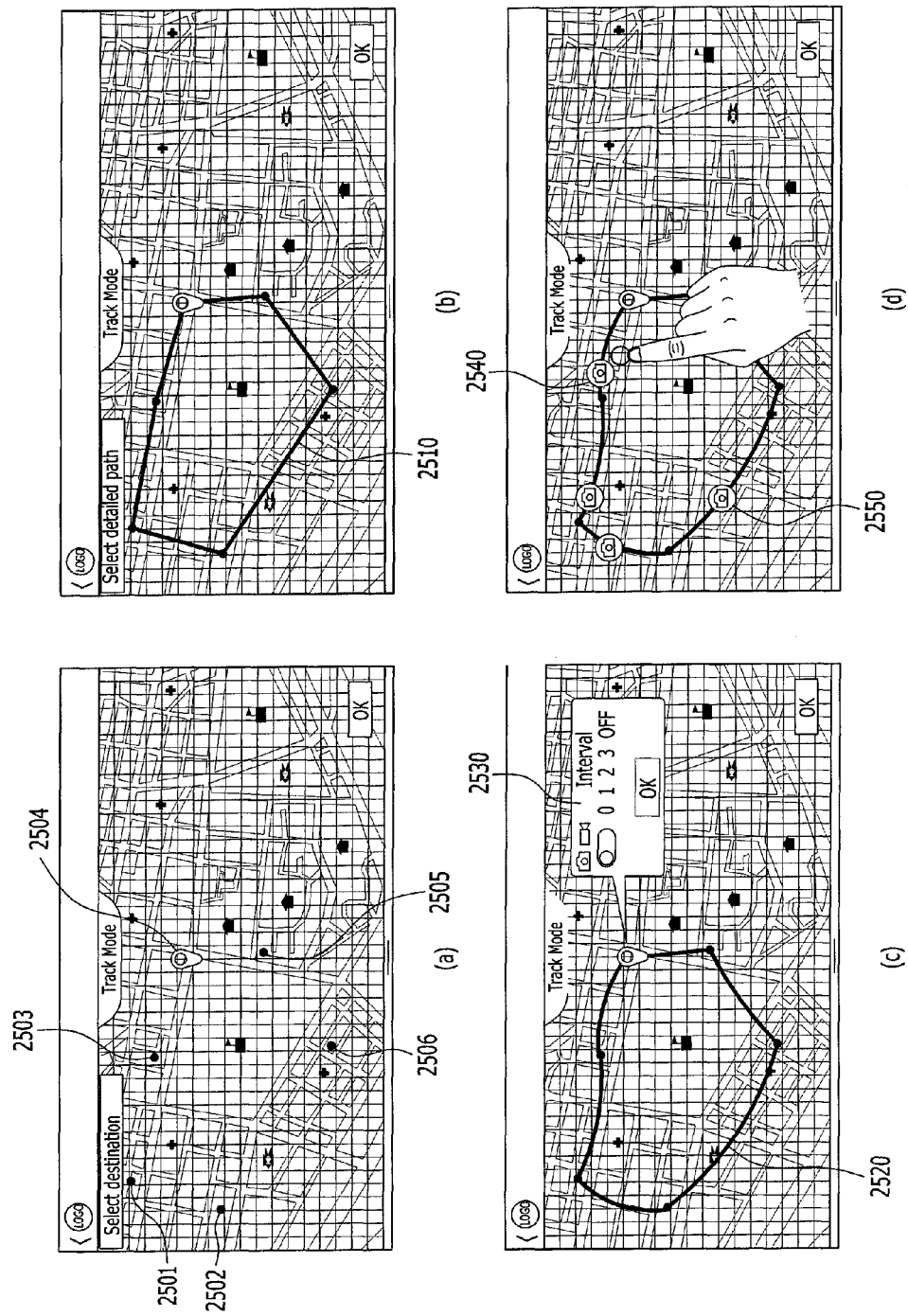
FIGS. 25 to 29 are diagrams to describe a 4th mode for controlling a drone using a mobile terminal according to one embodiment of the present invention.

Referring to FIG. 25 (*a*), assume that a user has selected 6 random points 2501 to 2506 from a map within a screen of a mobile terminal. In this case, referring to FIG. 25 (*b*), a straight path configured to connect the respective points sequentially is displayed.

Yet, the present invention is characterized in that a user can change a straight line of connecting the respective points by applying a drag [cf. FIG. 25 (*c*)]. Moreover, referring to FIG. 25 (*c*), an option 2520 for adjusting an interval of a photo taking is displayed per path.

Finally, referring to FIG. 25 (*d*), a camera mode of a drone can be changed for each path. For instance, it is set up not to take pictures on a 1st path 2540. For another instance, it is set up to allow a photo taking on a 2nd path 1550. Hence, technical effects of preventing a photo taking unnecessary for a user and memory consumption in advance can be provided.

Figure 26:
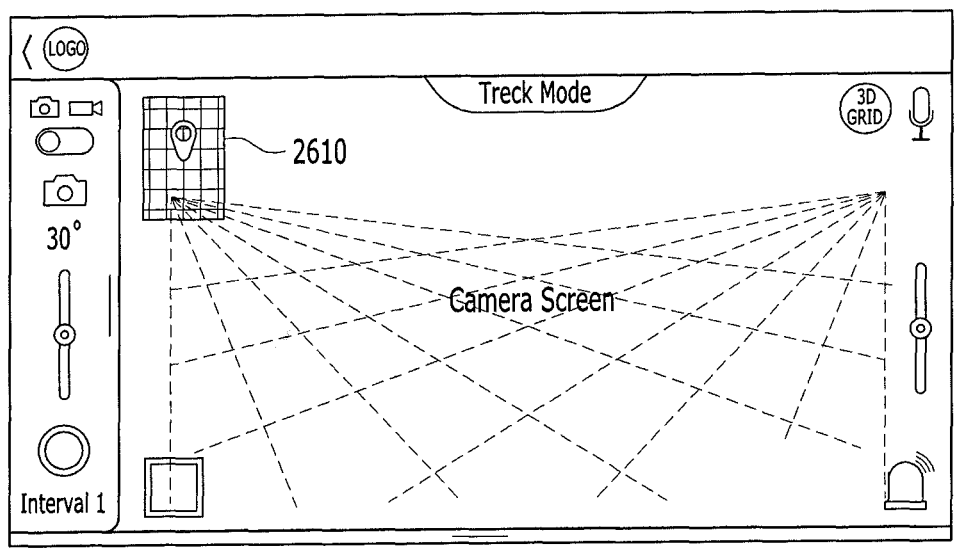

Moreover, referring to FIG. 26, a track mode is designed to display a mini status screen 2610 at a specific location of a mobile terminal. In this case, the mini status screen 2610 displays a moving path of a drone, a speed of a drone and the like by real time. If the mini status screen, it is designed to display detailed options for changing the moving path of the drone, which belongs to another scope of the appended claims and their equivalents of the present invention.

Figure 27:
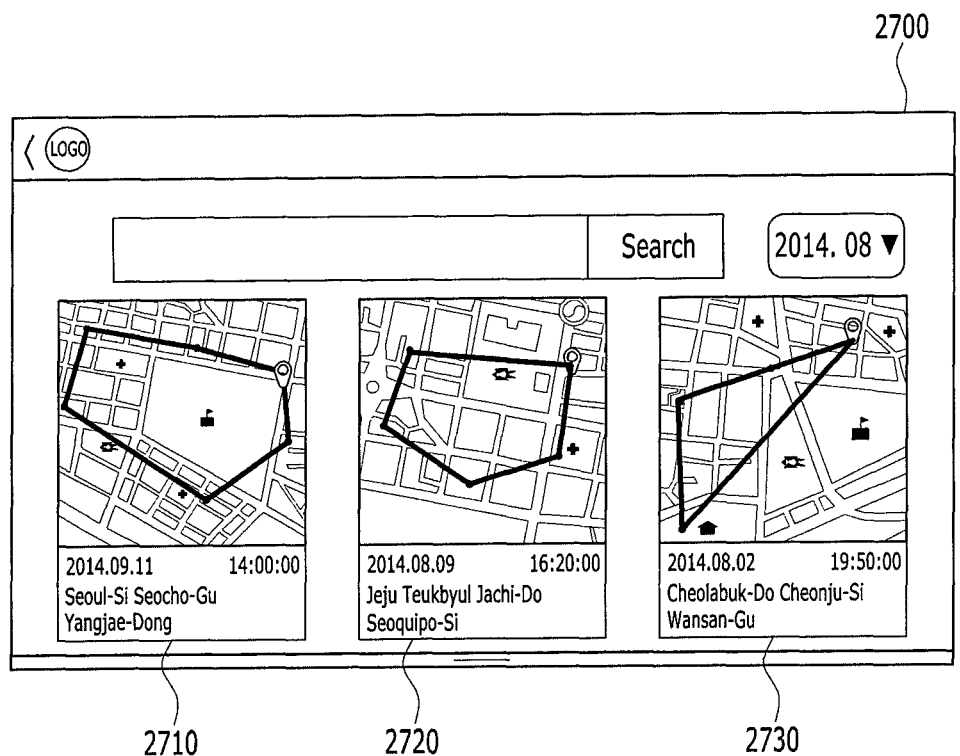
Figure 28:
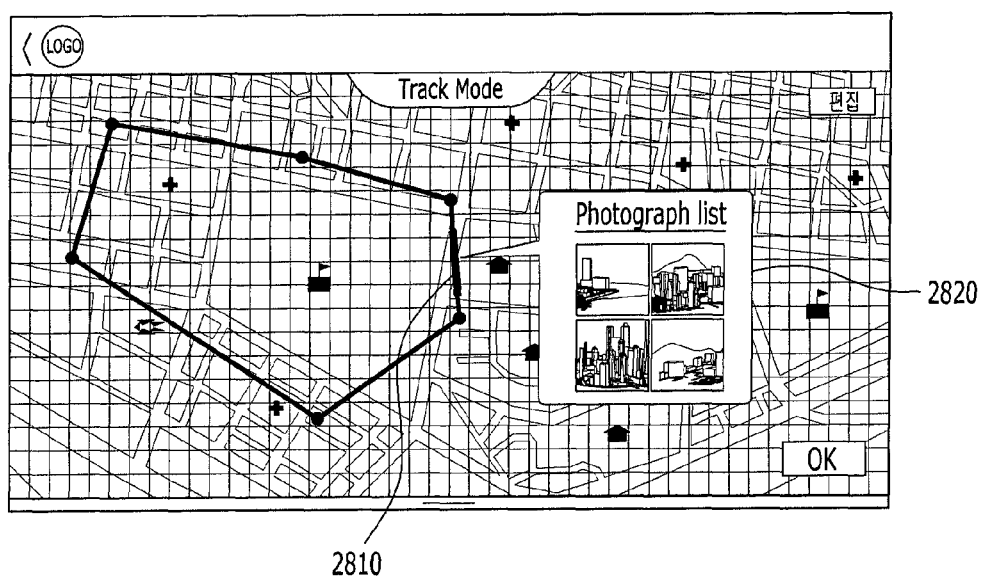

Meanwhile, FIG. 27 and FIG. 28 show embodiments for managing a taken photo or a video separately per interval in track mode.

First of all, referring to FIG. 27, paths (intervals) shot by a drone are saved in a history folder of a mobile terminal on dates 2710, 2720 and 2730, respectively. If a specific date 2700 is selected, photos and videos belonging to a range of the corresponding date are limitedly displayed only.

Moreover, if a specific date is selected from the folder corresponding to at least two dates shown in FIG. 27, a screen shown in FIG. 28 is outputted. Particularly, referring to FIG. 28, if a specific interval 2810 is selected, photos or videos taken in the selected specific interval are limitedly displayed as a list 2820.

Besides, other image data having a GPS value belonging to a preset range from a currently located point of a mobile terminal or a drone are outputted as a list [not shown in FIG. 27 and FIG. 28]. For instance, it is possible to bring a different photo having an identical or similar GPS value through an internet connection. In doing so, if a user selects a specific image data photographed by another person, it is designed that the drone photographs a point of the same GPS information and direction based on the corresponding GPS information and the corresponding direction information, which belongs to another scope of the appended claims and their equivalents of the present invention. Moreover, in case that a plurality of photos taken with a frequently used composition exist among photos (image data) saved in a mobile terminal, a drone is designed to take photos with the same composition with reference to them, which belongs to another scope of the appended claims and their equivalents of the present invention.

Figure 29:
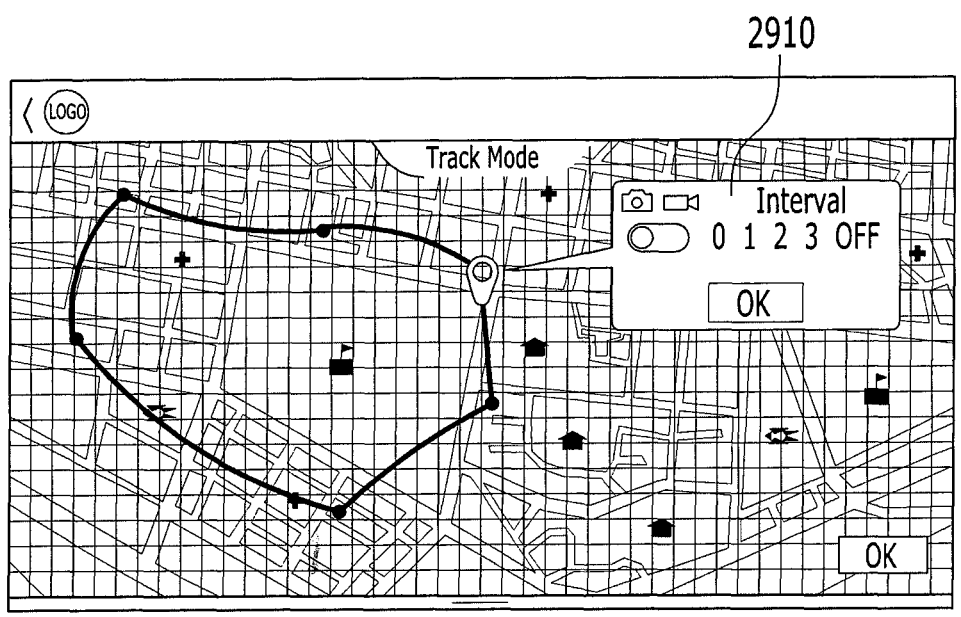

Moreover, referring to FIG. 29, it is possible to change a specific interval of a moving path in track mode. For instance, by touching and dragging a specific interval among intervals of a moving path shown in FIG. 29, it is able to quickly edit a detailed path. As mentioned in the foregoing description, an option 2910 for changing a camera mode of a specific interval is displayed. The option 290 shown in FIG. 29 selects an interval of a camera photographing for example, by which the scope of the appended claims and their equivalents of the present invention is non-limited.

FIGS. 30 to 34 are diagrams of editing data shot by a drone under the control of a mobile terminal according to one embodiment of the present invention. FIGS. 30 to 34 are applicable to all embodiments of the 1st to 4th modes mentioned in the foregoing description.

Figure 30:
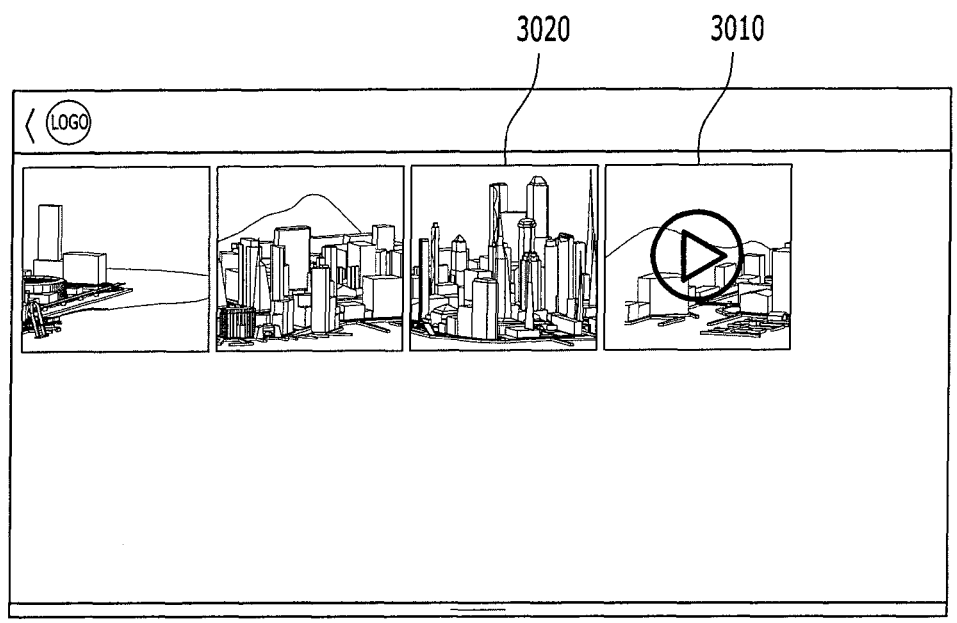
FIGS. 30 to 34 are diagrams of editing data shot by a drone under the control of a mobile terminal according to one embodiment of the present invention.

First of all, referring to FIG. 30, a photo 3020 or video 3010 shot in one of the aforementioned 1st to 4th modes is saved in a memory of a mobile terminal Of course, the photo 3020 or the video 3010 can be additionally saved in a memory of a drone as well.

If a random photo 3020 shown in FIG. 30 is selected, it is enlarged into a full screen. If the enlarged photo is selected again, it returns to a screen including the list shown in FIG. 30.

Meanwhile, FIGS. 31 to 34 show embodiments of sharing information related to a photo or video shot by a drone with another device.

Figure 31:
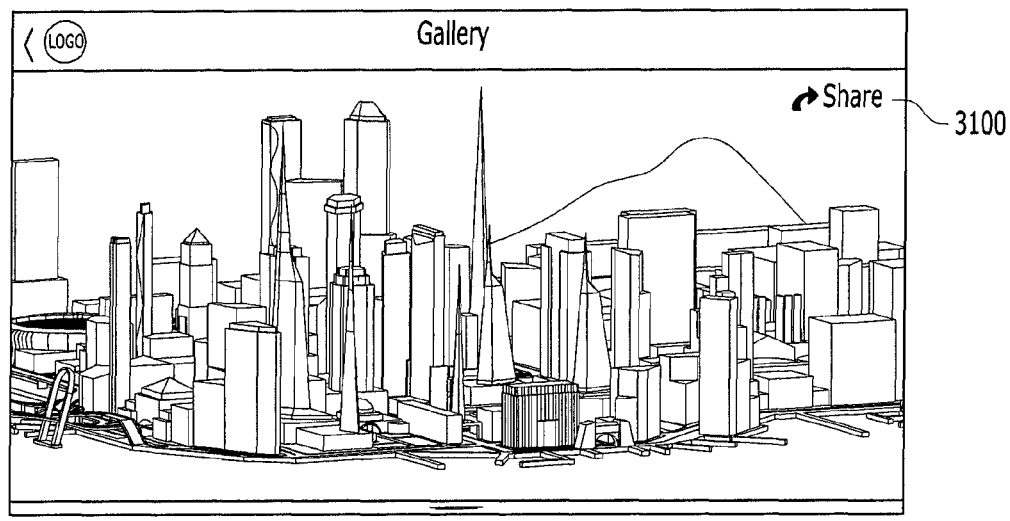

First of all, referring to FIG. 31, if a specific photo taken by a drone is selected, a tab 3100 for sharing the photo with a 3rd device is automatically created and outputted. In this case, the 3rd device corresponds to a specific mobile device, a server, a website or the like.

Figure 32:
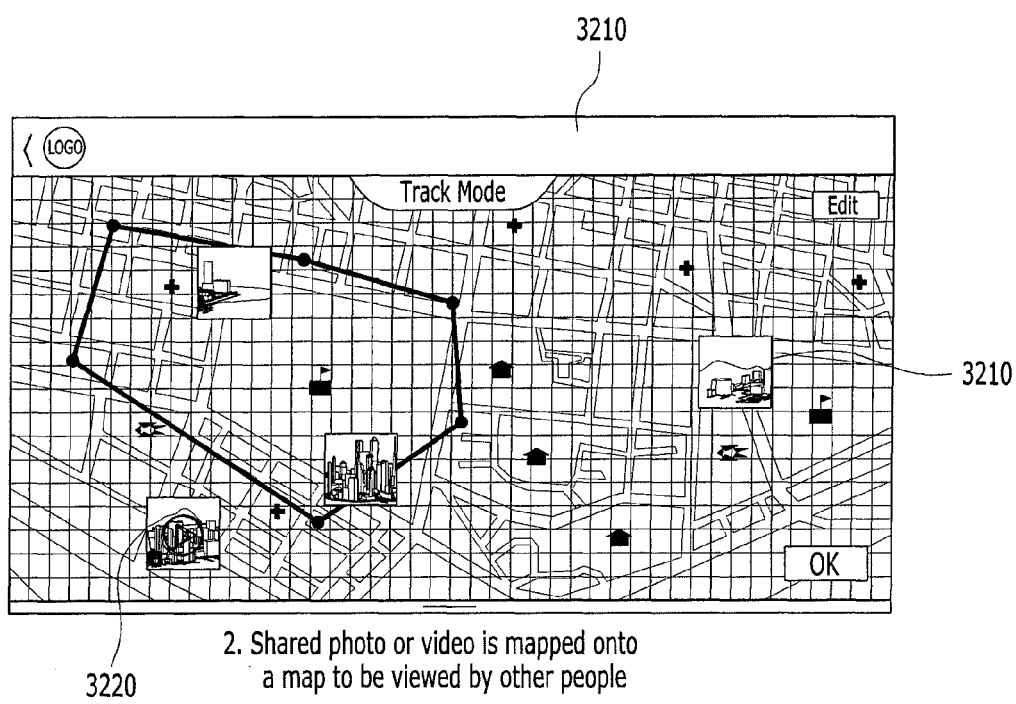

Moreover, referring to FIG. 32, the shared photo shown in FIG. 31 is outputted to a map in a mapped form. For instance, in case that a photo is uploaded to a random SNS, at least one or more photos 3210 and 3220 mapped per point shot by the drone are displayed on the map.

Figure 33:
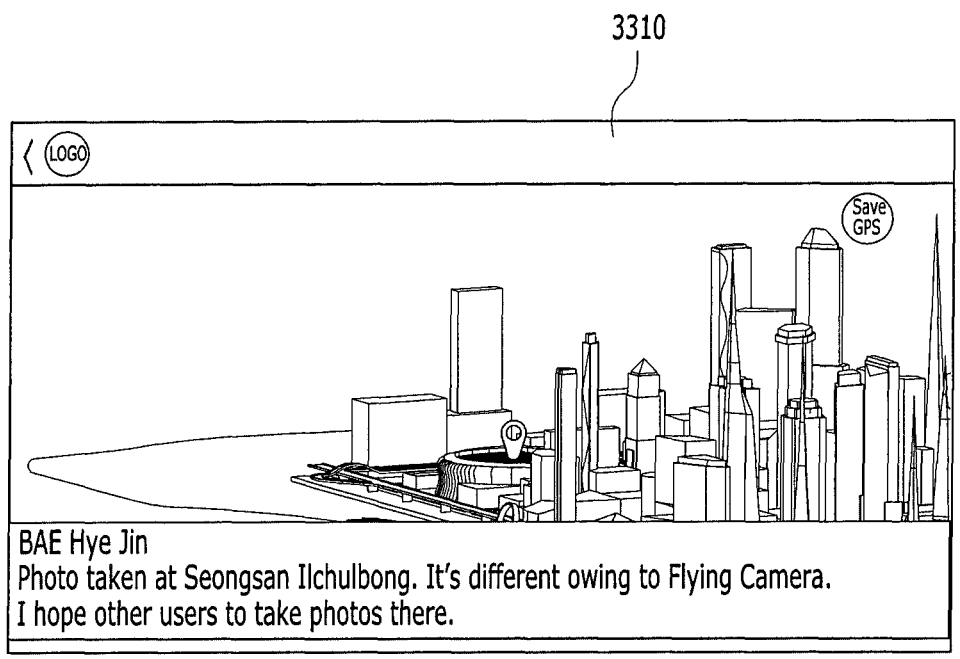
Figure 34:
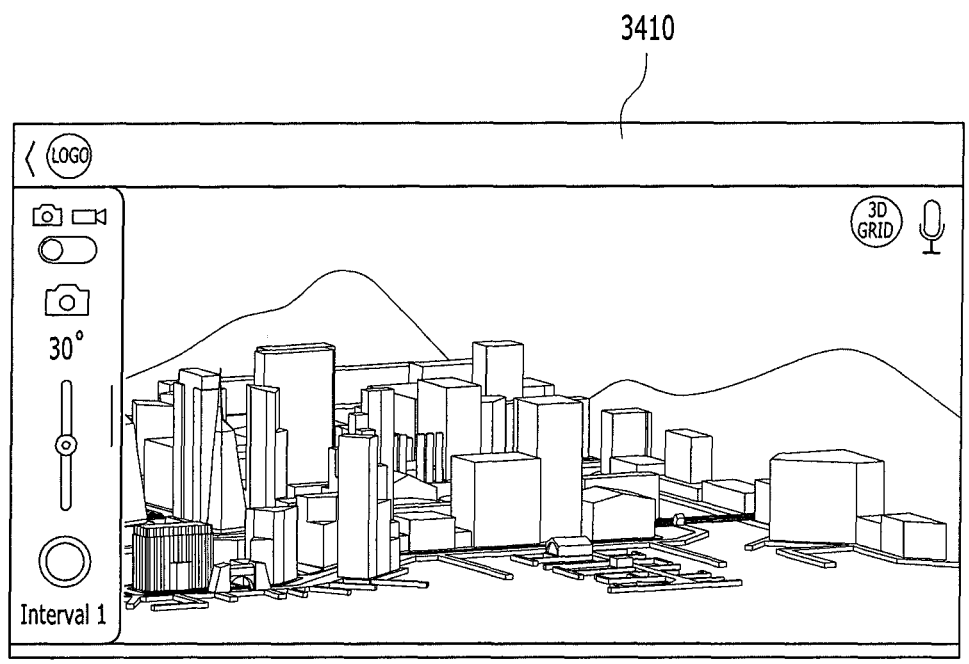

Referring to FIG. 33, in case of a mobile terminal capable of internet communication, photos or videos shot by other people can be outputted. In doing so, if a user selects a specific photo 3310, GPS information and angle information of the selected photo are extracted. Finally, in case that the extracted GPS and angle informations in FIG. 33 are transmitted to a drone, referring to FIG. 34, it is able to take a similar photo 3410.

The operations of the mobile terminal described with reference to FIGS. 1 to 34 are summarized and described as follows. Some steps can be deleted, modified or added and the order of the steps can be changed.

First of all, a method of controlling a mobile terminal according to one embodiment of the present invention may include the steps of performing a communication connection to at least one drone, displaying a screen for controlling a motion of the communication-connected drone, receiving a random touch drag within the displayed screen, generating a 1st control data for controlling an altitude of the drone if the received touch drag is recognized as a 1st direction with reference to a memory, generating a 2nd control data for controlling right and left directions of the drone if the received touch drag is recognized as a 2nd direction with reference to the memory, transmitting at least one of the generated 1st control data and the generated 2nd control data to the drone, and receiving a video data shot through a camera of the drone. The memory has been already described in detail with reference to FIG. 7.

The mobile terminal controlling method according to another embodiment of the present invention may further include the steps of receiving a signal for selecting a random point within the displayed screen, transmitting a location information of an object corresponding to the point to the drone, and receiving a video data including the object from the drone.

The mobile terminal controlling method according to another embodiment of the present invention may further include the steps of receiving a touch drag of a circle type and saving at least two photos taken in accordance with a direction of the circle type as a single file.

The screen may include a map including a location of the mobile terminal or the drone.

The mobile terminal controlling method according to another embodiment of the present invention may further include the steps of displaying an information on a specific location within the map and at least one photo belonging to a preset range (in this case, the at least one photo is received from an external server), extracting a tag information of a specific photo selected from the at least one photo, transmitting the extracted tag information to the drone, and receiving a video data shot on the basis of the tag information from the drone.

As mentioned in the foregoing description, the tag information includes at least one of a GPS information and a direction information of a taken photo for example.

The present invention mentioned in the foregoing description can be implemented into an application downloadable to a mobile terminal or a basic application provided as a default to the mobile terminal.

While one embodiment mentioned earlier in FIGS. 1 to 34 mainly concerns a process of controlling a drone using a mobile terminal, a different embodiment of the present invention mainly explains a technology of more promptly controlling a camera of the mobile terminal and a camera of the drone at the same time with reference to FIGS. 35 to 58 in the following. Of course, it is apparent that implementing a further different embodiment implemented by those skilled in the art with reference to FIG. 1 to FIG. 58 also belongs to the scope of the present invention.

Figure 35:
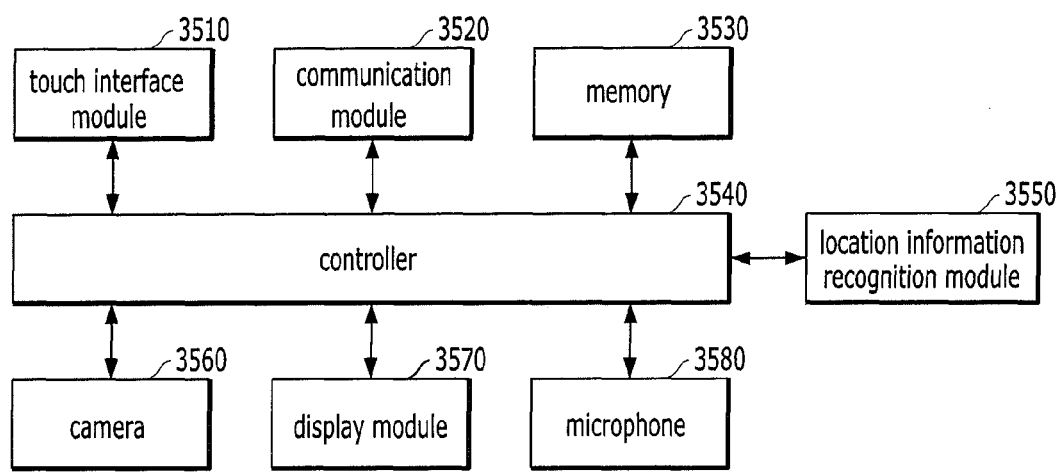
FIG. 35 is a diagram for internal main configuration modules of a mobile terminal according to a different embodiment of the present invention.

FIG. 35 is a diagram for internal main configuration modules of a mobile terminal according to a different embodiment of the present invention.

As shown in FIG. 35, a mobile terminal 3500 according to a different embodiment of the present invention includes a touch interface module 3510, a communication module 3520, a memory 3530, a controller 3540, a location information recognition module 3550, a camera 3560, a display module 3570 and a microphone 3580.

The touch interface module 3510 is designed to recognize a touch signal from a user. Such a terminology as a touch screen is used for the touch interface module. The communication module 3520 is designed to establish communication with at least one or more drones and there is no special restriction on establishing the connection. Meanwhile, since the drone is explained earlier in FIG. 5 and FIG. 6 in detail, overlapped explanation is omitted at this time.

The memory 3530 is designed to store at least one or more video data and the camera 3560 is able to capture a video data. In this case, the video data corresponds to a video or a still image for example.

The display module 3570 is designed to display a first video data received from a drone with which communication is established and a second video data captured by the camera on a second area and a first area, respectively. The controller 3570 is designed to control at least one of the second video data of the first area and the first video data of the second area according to a touch signal recognized by the touch interface module 3510. Regarding this, it shall be described in more detail in the following drawings.

According to a further different embodiment of the present invention, the controller 3540 is designed to change at least one of a position of the first area and a position of the second area in a manner of controlling the display module 3570.

Moreover, according to a further different embodiment of the present invention, if a call signal is received from an external mobile terminal, the controller 3540 is designed to control the display module 3570 to display a third video data captured by the external mobile terminal on a third area. And, the controller 3540 controls the display module 3570 to sequentially display the third video data, the second video data and the first video data in a manner of being overlaid. And, the controller 3540 synthesizes the second video data and the first video data and controls the synthesized video data to be transmitted to the external mobile terminal. Regarding this, it shall be described in more detail with reference to FIG. 53 and FIG. 54.

Meanwhile, if the touch signal is recognized on a predetermined specific position via the touch interface module 3510, the memory 3530 stores a first video data captured by a camera of the drone and a second video data captured by a camera 3560 of the mobile terminal Regarding this, it shall be described with reference to FIG. 44 in the following. Moreover, the controller 3540 controls the display module 3570 to display an option used for selectively storing at least one of a first audio data recognized by a microphone of the drone and a second audio data recognized by a microphone 3580 of the mobile terminal Regarding this, it shall be described with reference to FIG. 45 in the following.

And, the location information recognition module 3550 shown in FIG. 35 is designed to recognize a position of the mobile terminal 3500 and GPS (global positioning system) information may be used for example. Moreover, the controller 3540 is designed to control the communication module 3520 to transmit location information of the mobile terminal to the drone. The first video data is captured within a predetermined range from the location information of the mobile terminal.

Moreover, in case of capturing a selfie, a mobile terminal according to a further different embodiment is designed to capture a picture in an identical background or an opposite background after a drone moves to a position in the vicinity of the mobile terminal. By doing so, a conventional problem, which is incapable of capturing a wider background screen due to arm length of a user holding the mobile terminal and the like, can be solved.

For instance, the touch interface module 3510 shown in FIG. 35 receives a touch input, the communication module 3520 performs communication establishment with at least one or more drones and the controller 3540 is designed to control the communication module 3520 and the touch interface module 3510.

In particular, the controller 3540 transmits location information of the mobile terminal to a drone with which communication is established, designates a position of the drone based on the transmitted location information, receives a preview image obtained by a camera of the drone, displays the received preview image on a predetermined first area and if a touch input is recognized, captures the preview image displayed on the first area. Moreover, for instance, the controller 3540 displays a preview image obtained by a camera of the mobile terminal on a predetermined second area. Regarding this, it shall be described in more detail with reference to FIG. 40.

The controller 3540 displays an option used for selecting one of a first mode and a second mode. The first mode can control the preview image displayed on the first area and the preview image displayed on the second area by a single indicator. The second mode can control the preview image displayed on the first area and the preview image displayed on the second area by indicators different from each other. If a capturing mode of the camera of the drone is different from a capturing mode of the camera of the mobile terminal, the controller 3540 controls the first mode to be inactivated. And, the capturing mode corresponds to one of a video capturing mode and a picture capturing mode. Regarding this, it shall be described in detail with reference to FIG. 43.

The controller 3540 displays a sub option used for selecting distance between the drone and the mobile terminal and relative direction information and transmits the selected distance and the relative direction information to the drone. Regarding this, it shall be described with reference to FIG. 45.

The controller 3540 calculates an angle covered by the camera of the mobile terminal and transmits additional information associated with the calculated angle to the drone. Moreover, the additional information corresponds to a numerical value of the calculated angle or (360 degrees—the numerical value of the calculated angle). Regarding this, it shall be described with reference to FIG. 51.

If a random object is selected from the preview image displayed on the second area, the controller 3540 transmits additional information to the drone to capture a picture in a predetermined position away from the selected object. For instance, the additional information includes at least one selected from the group consisting of distance between the drone and the object, relative direction information and a camera capturing scheme. For instance, the camera capturing scheme corresponds to one selected from the group consisting of a first type capturing the object at the front, a second type capturing a side of the object while rotating 360 degrees and a third type capturing the top of the object at an altitude higher than the object. Regarding this, it shall be described later with reference to FIG. 46.

The first mode provides a single graphic image to capture the preview image displayed on the first area and the preview image displayed on the second area at the same time. The second mode provides a graphic image used for capturing the preview image displayed on the first area and a graphic image used for capturing the preview image displayed on the second area, respectively. Regarding this, it shall be described later with reference to FIG. 43.

The controller 3540 changes at least one of a position and a size of the first area and the second area. Moreover, if a touch input is recognized on the first area or the second area for more than a predetermined time, the controller 3540 displays a specific area to which the touched first area or the second area is capable of moving. Regarding this, it shall be described later with reference to FIG. 42.

The controller 3540 displays a position of the mobile terminal and a position of the drone on a single map. The map includes information indicating a moving path of the mobile terminal, a moving path of the drone, a direction at which the camera of the mobile terminal is facing and a direction at which the camera of the drone is facing. Regarding this, it shall be described later with reference to FIG. 47.

If a call signal is received from an external mobile terminal, the controller 3540 displays a preview image obtained by a camera of the external mobile terminal on a predetermined third area. Regarding this, it shall be described later with reference to FIG. 53 and FIG. 54.

The controller 3540 displays an option used for selectively storing at least one of a first audio data obtained by a microphone of the drone and a second audio data obtained by a microphone of the mobile terminal. Regarding this, it shall be described later with reference to FIG. 45.

The controller 3540 detects a specific part of a user in the second area and transmits a command controlling a motion of the drone based on the detected specific part. For instance, the specific part of the user corresponds to at least one selected from the group consisting of a mouth, eyes and a hand of the user. Regarding this, it shall be described later with reference to FIG. 52.

The controller 3540 transmits timing of capturing the preview image obtained by the camera of the mobile terminal or location information after predetermined time elapses to the drone. For instance, the location information includes information on a direction identical to a direction at which the camera of the mobile terminal is facing or information on a direction opposite to the direction at which the camera of the mobile terminal is facing. Regarding this, it shall be described later with reference to FIG. 55 to FIG. 58.

The controller 3540 displays a preview image obtained by the camera of the mobile terminal (the preview image is divided into a plurality of areas), if a touch input is recognized on a specific area among a plurality of the areas in the preview image, transmits location information corresponding to the specific area to the drone and displays a preview image obtained by the camera of the drone. For instance, the preview image obtained by the camera of the drone is displayed on the specific area. For instance, the preview image obtained by the camera of the drone corresponds to an image captured from a distance relatively closer compared to the preview image obtained by the camera of the mobile terminal. Regarding this, it shall be described later with reference to FIG. 50.

Figure 36:
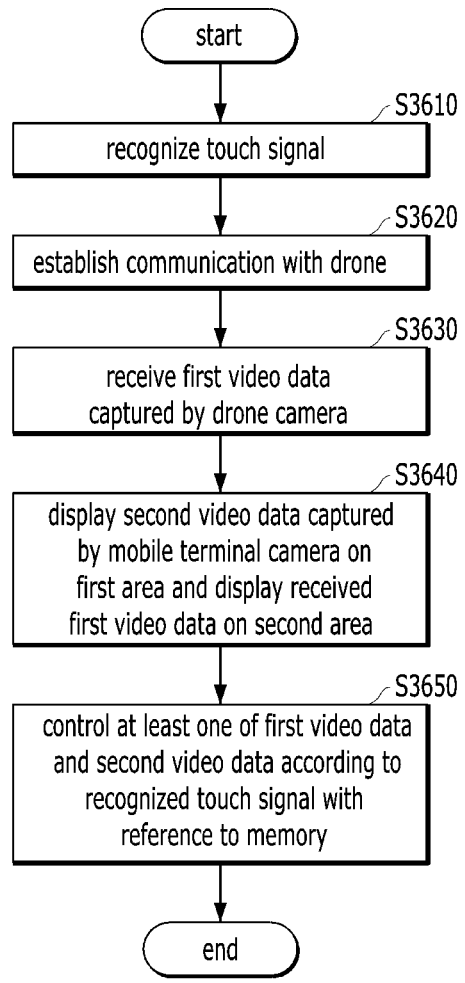
FIG. 36 is a flowchart for a method of controlling a mobile terminal according to a different embodiment of the present invention.

FIG. 36 is a flowchart for a method of controlling a mobile terminal according to a different embodiment of the present invention. Those skilled in the art can complementally comprehend FIG. 36 with reference to FIG. 35 mentioned above.

As shown in FIG. 36, a mobile terminal recognizes a touch signal [S3610] and establishes connection with at least one or more drones [S3620]. Subsequently, the mobile terminal receives a first video data capture by a camera of the drone [S3630] and displays a second video data captured by a camera of the mobile terminal and the received first video data on a first area and a second area, respectively [S3640].

Subsequently, the mobile terminal is designed to control at least one of the second video data displayed on the first area and the first video data displayed on the second area according to the recognized touch signal [S3650].

Meanwhile, a method of controlling a mobile terminal according to a further different embodiment of the present invention mentioned earlier in FIG. 35 includes the steps of receiving a touch input, establishing communication with at least one or more drones, transmitting location information of the mobile terminal to the drone with which the communication is established, designating a position of the drone based on the transmitted location information and receiving a preview image obtained by a camera of the drone, displaying the received preview image on a predetermined first area and if the touch input is recognized, capturing the preview image displayed on the first area.

Figure 37:
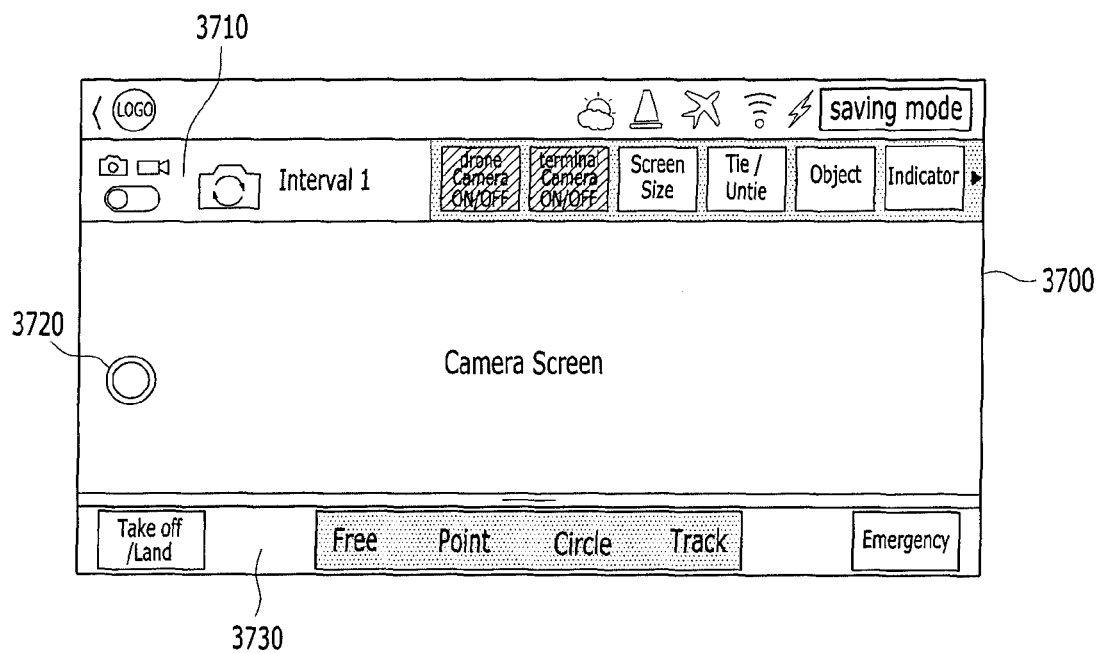
FIG. 37 is a diagram for an initial screen used for processing a video data received from a camera of a drone and a camera of a mobile terminal processed by the mobile terminal according to a different embodiment of the present invention.

FIG. 37 is a diagram for an initial screen used for processing a video data received from a camera of a drone and a camera of a mobile terminal processed by the mobile terminal according to a different embodiment of the present invention.

As mentioned in the foregoing description, assume that a mobile terminal 3700 shown in FIG. 37 is able to communicate with a drone. In particular, the mobile terminal is able to receive a video data captured by a camera of the drone in real time. First of all, the mobile terminal 3700 distinctively displays three areas to control both the camera of the drone and a camera of the mobile terminal Of course, deleting or modifying one of the three areas also belongs to the scope of the present invention.

A first area 3710 corresponds to a graphic image to control the camera of the mobile terminal and the camera of the drone and a second area 3730 corresponds to a graphic image to control the drone itself. Moreover, a camera screen positioned between the first area 3710 and the second area 3730 outputs at least one of a video data captured by the camera of the mobile terminal and a video data captured by the camera of the drone. Meanwhile, the first area 3710 and the second area 3730 may be positioned at positions opposite to each other. A video data captured by a camera may be called a preview image. Moreover, when a capture button (or shutter button) is pushed on a moment that a scene preferred by a user is coming out, the preview image is captured and stored.

A video data captured by the camera of the mobile terminal or the camera of the drone is stored using an option 3720 of a camera shutter shape. Although FIG. 37 shows an example of a camera screen, both a video data received from the camera of the mobile terminal and a video data received from the camera of the drone can be outputted in a manner of dividing the camera screen. Regarding this, it shall be described with reference to FIG. 38 to FIG. 41 in the following.

FIGS. 38 to 41 are diagrams for a process of controlling a size of a camera screen of a drone and a size of a camera screen of a mobile terminal controlled by the mobile terminal according to a different embodiment of the present invention.

Figure 38:
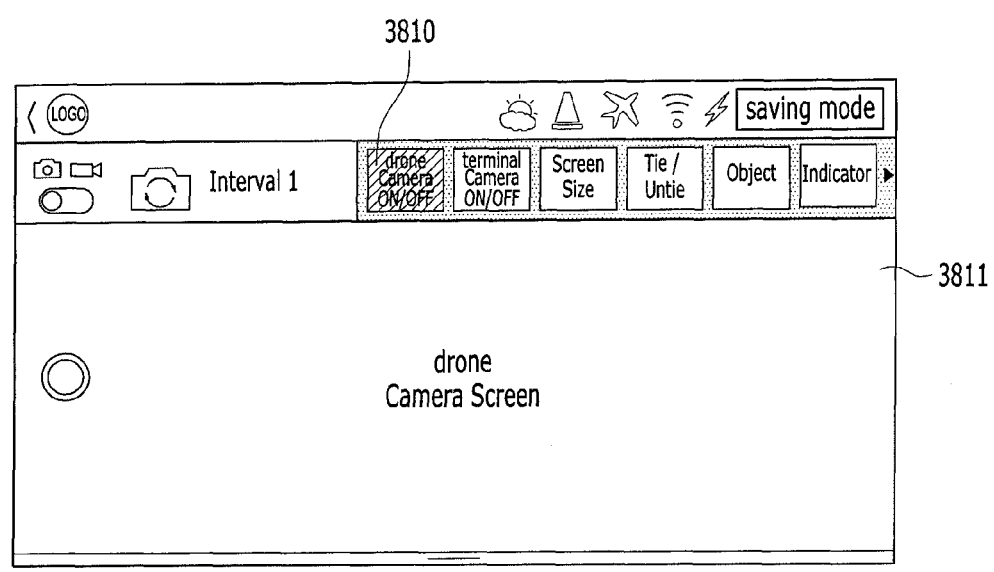
FIGS. 38 to 41 are diagrams for a process of controlling a size of a camera screen of a drone and a size of a camera screen of a mobile terminal controlled by the mobile terminal according to a different embodiment of the present invention.

If a first option 3810 shown in FIG. 38 is selected, a video data captured by a camera of a drone is outputted on a screen 3811 of a mobile terminal. In this case, unnecessary power consumption can be reduced in a manner of switching a state of a camera of the mobile terminal into an off state.

Figure 39:
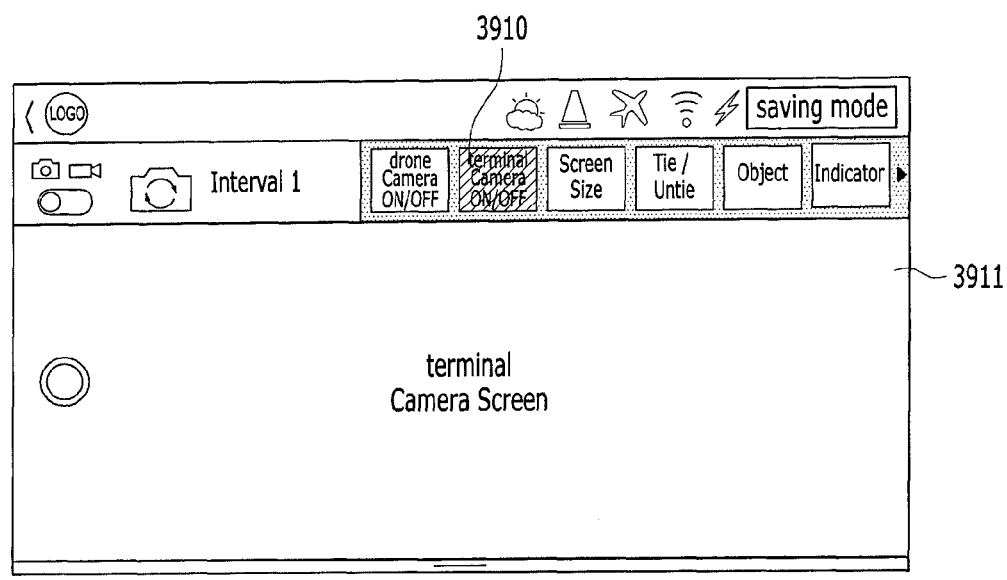

On the contrary, if a second option 3910 shown in FIG. 39 is selected, a video data captured by a camera of the mobile terminal is outputted on a screen 3911 of the mobile terminal. In this case, unnecessary power consumption and loss of communication data can be avoided in a manner of switching a state of the camera of the drone into an off state.

Figure 40:
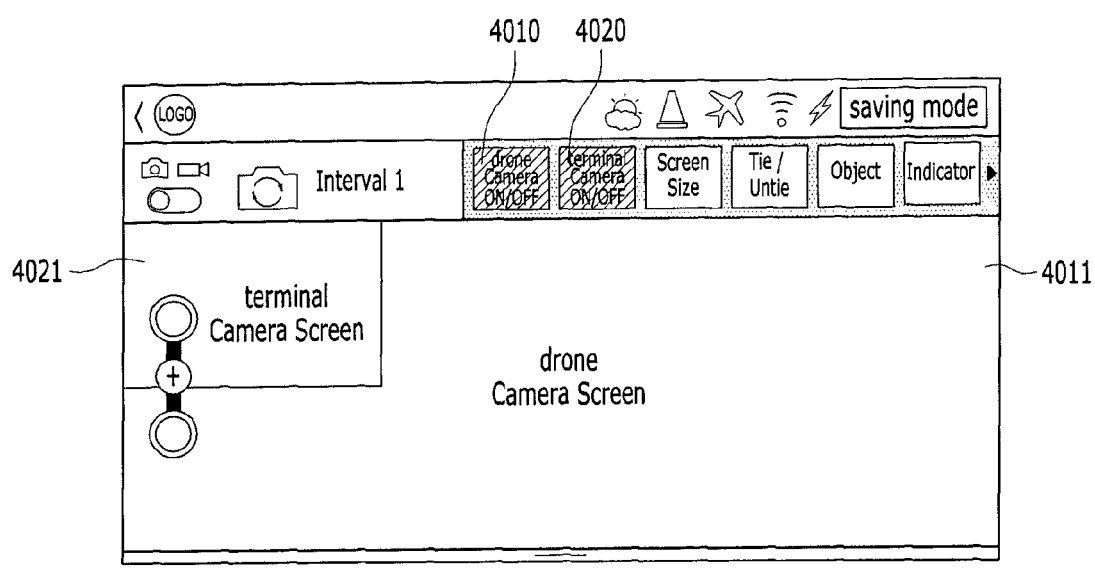
Figure 41:
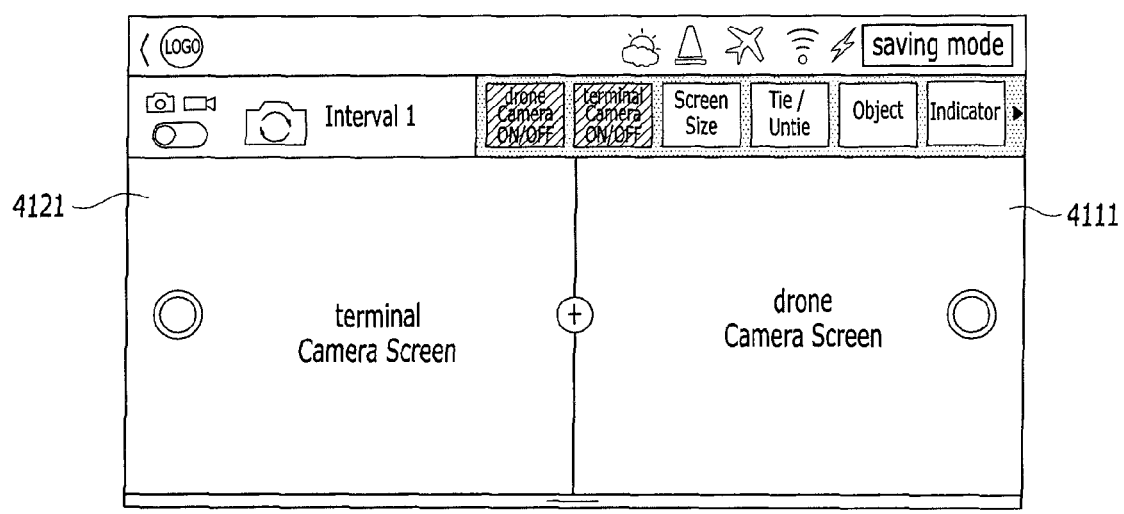

FIG. 38 and FIG. 39 assume a case that one of the video data captured by the camera of the mobile terminal and the video data captured by the camera of the drone is displayed only. Yet, a user may have a need to check the two video data at the same time. FIG. 40 and FIG. 41 show an embodiment satisfying the need.

As shown in FIG. 40 and FIG. 41, a mobile terminal according to a different embodiment of the present invention provides a dual camera function. The dual camera function corresponds to a concept different from a concept of a related art including two cameras in a single device.

As shown in FIG. 40, assumes a case that both an option 4010 configured to turn on a camera of a drone and an option 4020 configured to turn on a camera of a mobile terminal are selected. In this case, a video data (or a preview image) captured by the camera of the drone is outputted on a first area 4011 and a video data (or a preview image) captured by the camera of the mobile terminal is outputted on a second area 4021. In particular, the mobile terminal controls the drone to capture an image on a specific point or a specific area in a manner of transmitting location information of the mobile terminal to the drone and displays a preview image captured by the camera of the drone via the mobile terminal.

Meanwhile, similar to FIG. 40, FIG. 41 also assumes a case that both the option 4010 configured to turn on the camera of the drone and the option 4020 configured to turn on the camera of the mobile terminal are selected. Yet, FIG. 41 is different from FIG. 40 in that a first area 4121 on which a video data captured by the camera of the mobile terminal is outputted and a second area 4111 on which a video data captured by the camera of the drone is outputted are designed to have a size identical to each other. The present invention intends to propose a technology capable of easily and randomly providing a position and a size of an area on which a video data of each camera is outputted. Regarding this, it shall be described with reference to FIG. 42 in the following.

Figure 42:
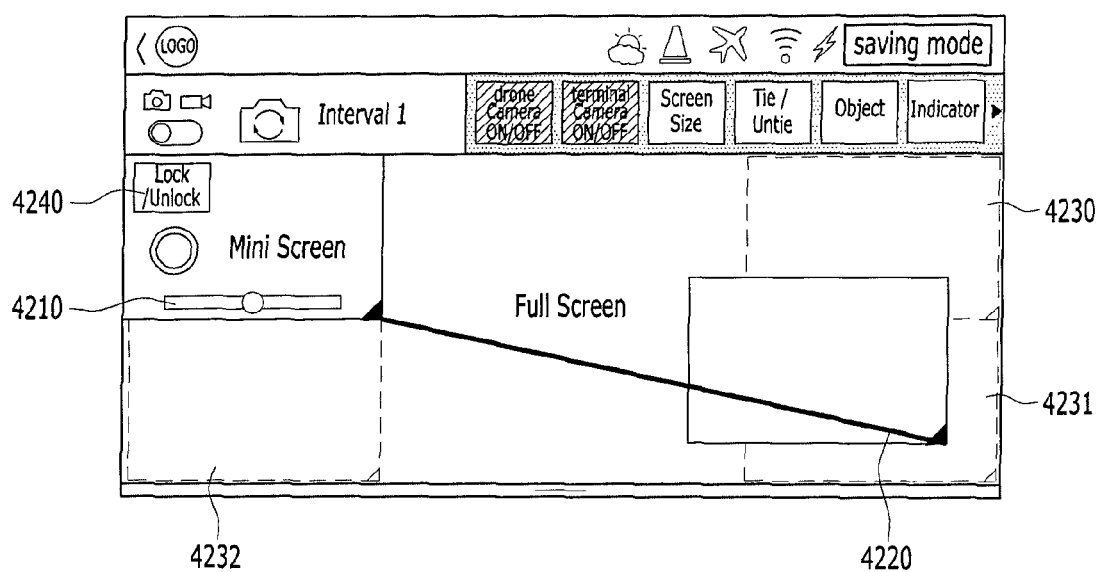
FIG. 42 is a diagram for a process of changing a position of a camera screen of a drone or a position of a camera screen of a mobile terminal changed by the mobile terminal according to a different embodiment of the present invention.

FIG. 42 is a diagram for a process of changing a position of a camera screen of a drone or a position of a camera screen of a mobile terminal changed by the mobile terminal according to a different embodiment of the present invention.

Referring to FIG. 42, a mini screen corresponds to an area (first area) on which a preview image captured by a camera of a mobile terminal is outputted and a full screen corresponds to an area (second area) on which a preview image captured by a camera of a drone is outputted. A position or a size of the first area and the second area can be changed automatically or changed by configuration of a user (4220).

Moreover, if a touch input is recognized on one 4210 of the first area and the second area for more than a predetermined time, at least one or more specific areas 4230/4231/4232 to which the touched area is capable of being moved is displayed. Of course, in order to prevent the touched area from being moved without notifying a user, an option 4240 disabling a screen to be moved is provided.

Figure 43:
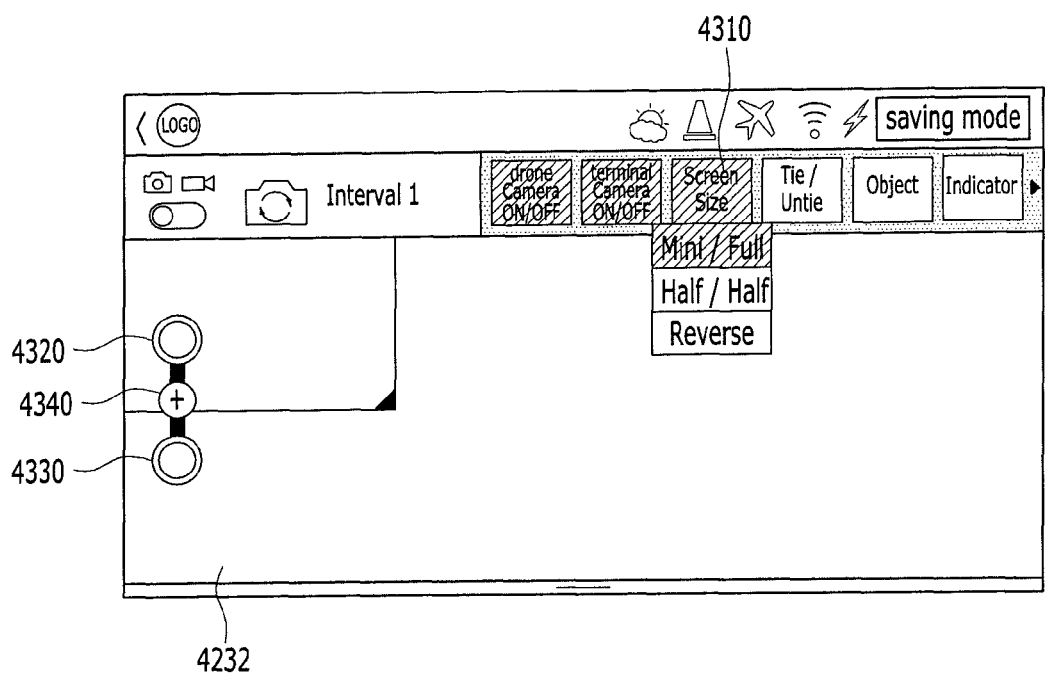
FIG. 43 is a diagram for a different example of a process of controlling a size of a camera screen of a drone and a size of a camera screen of a mobile terminal controlled by the mobile terminal according to a different embodiment of the present invention.

FIG. 43 is a diagram for a different example of a process of controlling a size of a camera screen of a drone and a size of a camera screen of a mobile terminal controlled by the mobile terminal according to a different embodiment of the present invention.

It is able to more easily change a size of a first area (corresponding to a camera of a drone) and a size of a second area (corresponding to a camera of a mobile terminal) using an option 4310 related to a screen size shown in FIG. 43. One of the two areas can be relatively enlarged or the two areas may be changed to an identical size.

Moreover, an option configured to select a first mode, which is capable of controlling a preview image displayed on the first area and a preview image displayed on the second area by a single indicator, is displayed. And, an option configured to select a second mode, which is capable of controlling the preview image displayed on the first area and the preview image displayed on the second area by indicators different from each other, is displayed.

If a camera capturing mode of the drone is different from a camera capturing mode of the mobile terminal, the first mode is controlled to be inactivated. For instance, the capturing mode corresponds to one of a video capturing mode and a picture capturing mode. In particular, a user is able to more easily and promptly comprehend that it is impossible to synthesize a still image and a video with each other.

As shown in FIG. 43, the first mode provides a graphic image 4340 configured to capture the preview image displayed on the first area and the preview image displayed on the second area at the same time. On the contrary, as shown in FIG. 43, the second mode provides a graphic image 4320 configured to capture the preview image displayed on the first area and a graphic image 4330 configured to capture the preview image displayed on the second area, respectively.

Figure 44:
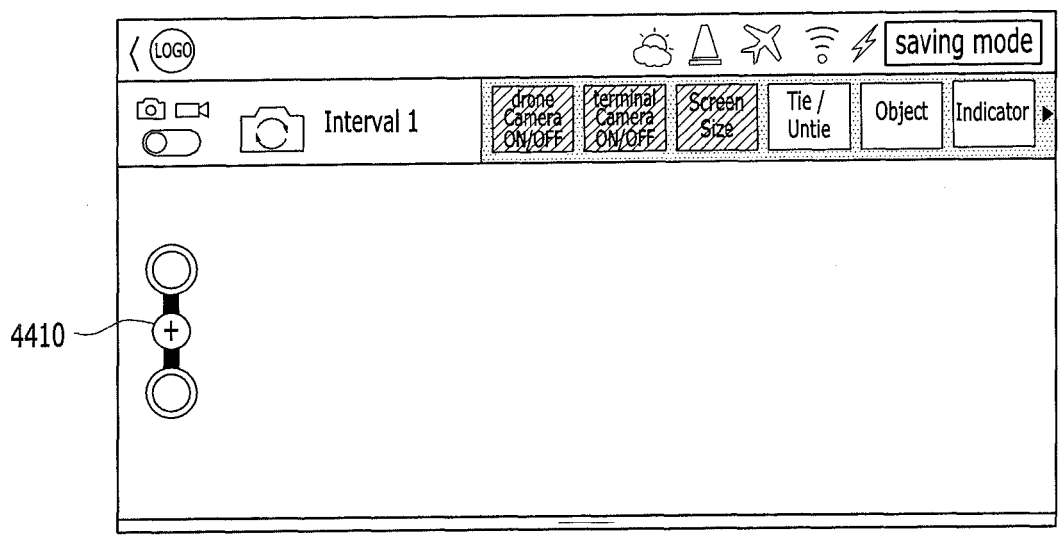
FIGS. 44 and 45 are diagrams for a process of controlling a camera of a drone and a camera of a mobile terminal controlled by the mobile terminal according to a different embodiment of the present invention.
Figure 45:
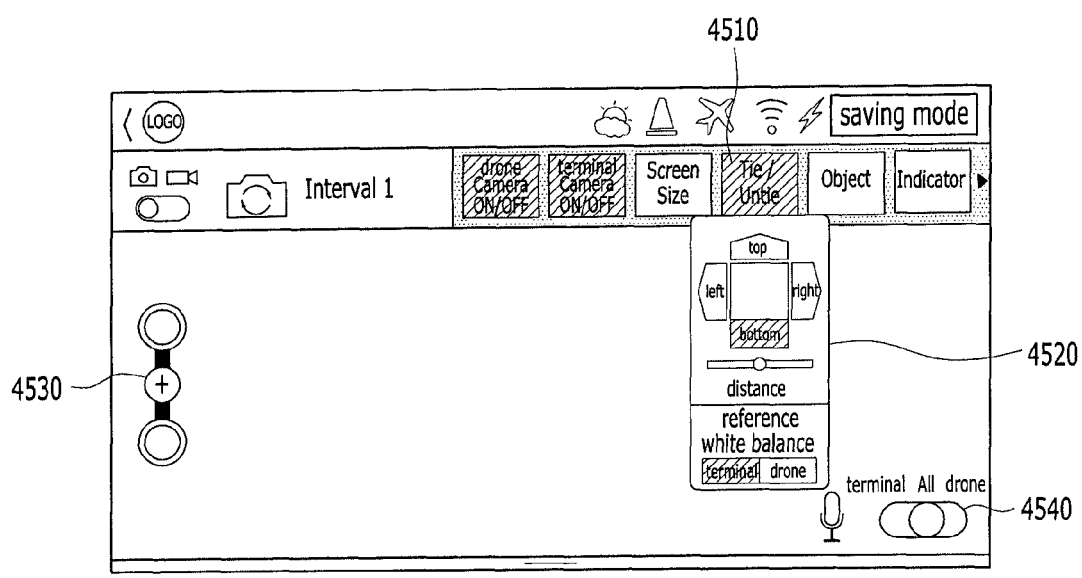

FIGS. 44 and 45 are diagrams for a process of controlling a camera of a drone and a camera of a mobile terminal controlled by the mobile terminal according to a different embodiment of the present invention.

It is designed to capture a preview image captured by a camera of a mobile terminal and a preview image captured by a camera of a drone at the same time whenever an indicator 4410 shown in FIG. 44 is selected. By doing so, it is not necessary for a user to push a button twice to capture the images captured by each camera.

Moreover, as shown in FIG. 45, if an option related to tie/untie is selected, a sub option 4520 configured to select distance between a drone and a mobile terminal and relative direction information is displayed. Distance and relative direction information selected by a user are transmitted to the drone. By doing so, the drone can be used for capturing surroundings of the mobile terminal.

And, it is able to display an option 4540 configured to selectively store at least one of a first audio data obtained by a microphone of the drone and a second audio data obtained by a microphone of the mobile terminal.

After all of the aforementioned options 4520/4540 are selected, the preview image captured by the camera of the drone and the preview image captured by the camera of the mobile terminal are stored at the same time whenever an integrated indicator 4530 is selected. By doing so, the mobile terminal focuses on a user carrying the mobile terminal and captures the user itself using the camera of the mobile terminal and it is able to capture surroundings of the user carrying the mobile terminal in more detail using the camera of the drone.

Figure 46:
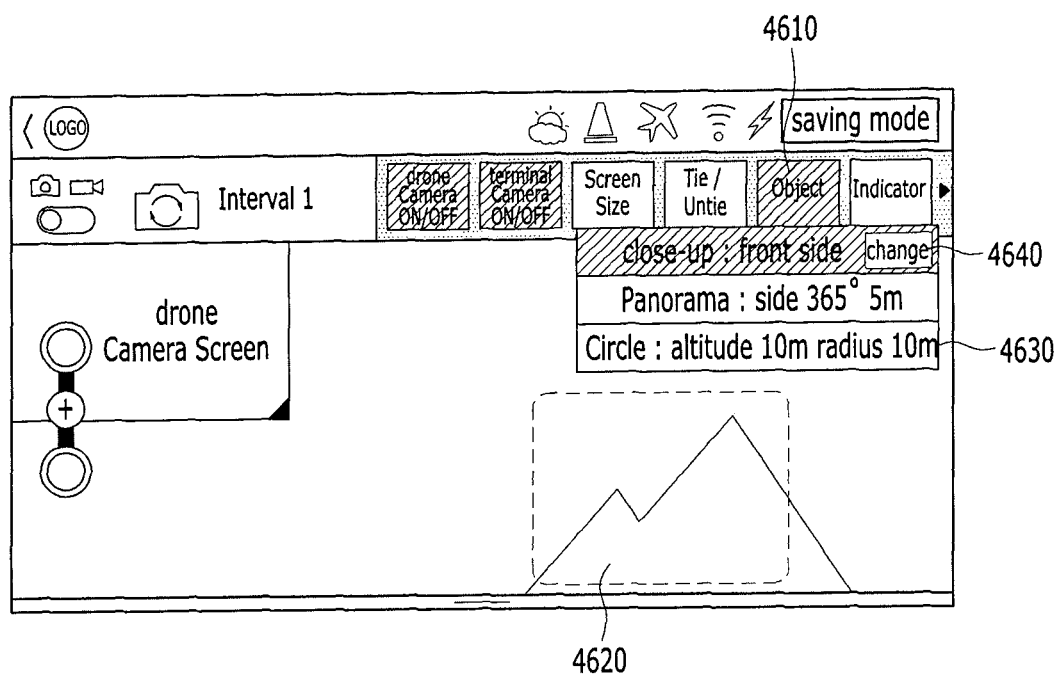
FIG. 46 is a diagram for a process of controlling a drone using a camera screen of a mobile terminal controlled by the mobile terminal according to a different embodiment of the present invention.

FIG. 46 is a diagram for a process of controlling a drone using a camera screen of a mobile terminal controlled by the mobile terminal according to a different embodiment of the present invention.

FIG. 46 shows an option 4610 related to an object. For instance, if a random object 4620 in a preview image displayed on a second area corresponding to a camera of a mobile terminal is selected, additional information used for capturing an image from a predetermined position from the object is transmitted to a drone.

For instance, the additional information includes at least one selected from the group consisting of a distance between the drone and the object, relative direction information and a camera capturing scheme. For instance, the camera capturing scheme corresponds to one of a first type (close-up shown in FIG. 46) capturing the object at the front, a second type (panorama shown in FIG. 46) capturing a side of the object while rotating 360 degrees and a third type (circle shown in FIG. 46) capturing the top of the object at an altitude higher than the object.

Moreover, as shown in FIG. 46, a menu 4630 capable of controlling the additional information is displayed on a prescribed area and an option capable of changing a specific numerical value and the like is also provided.

Figure 47:
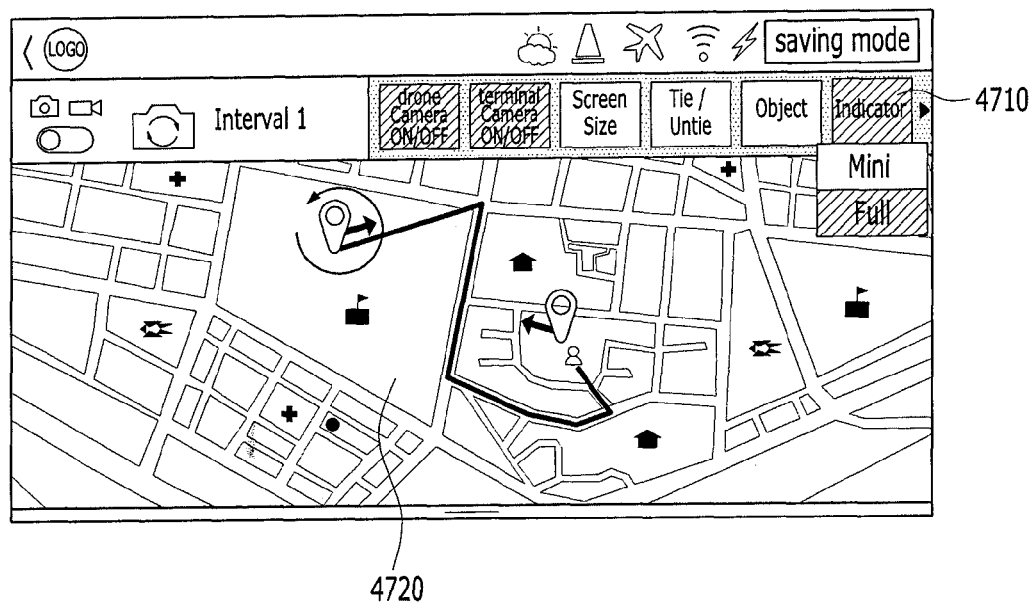
FIGS. 47 and 48 are diagrams for a process of displaying a camera of a drone and a camera of a mobile terminal on a screen displayed by the mobile terminal according to a different embodiment of the present invention.
Figure 48:
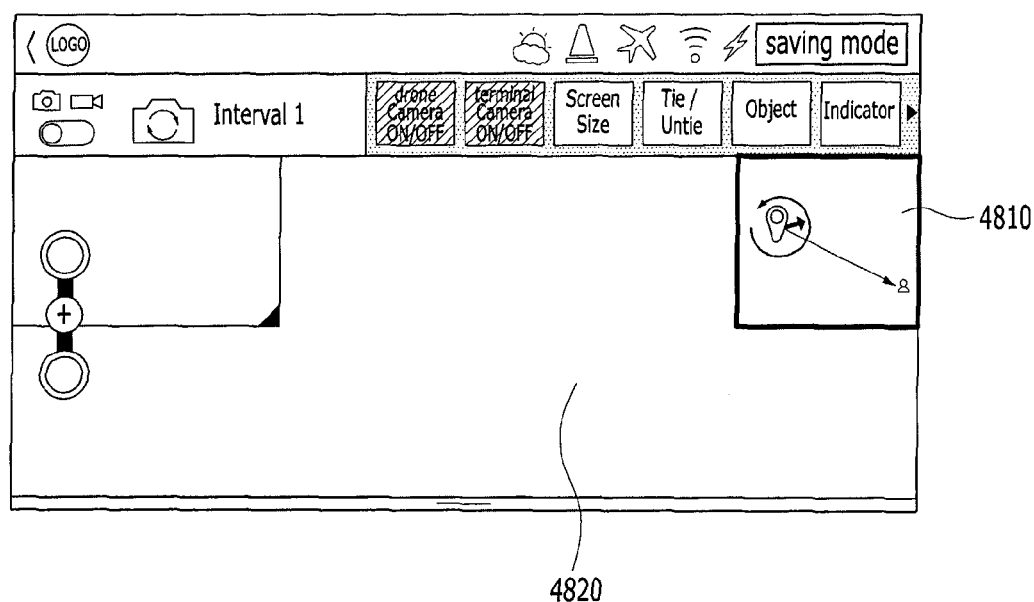

FIGS. 47 and 48 are diagrams for a process of displaying a camera of a drone and a camera of a mobile terminal on a screen displayed by the mobile terminal according to a different embodiment of the present invention.

As shown in FIG. 47, an option 4710 related to an indicator is provided. If the option 4710 is selected, a position of the mobile terminal and a position of the drone are displayed on a single map 4720. For instance, the map includes information indicating a moving path of the mobile terminal, a moving path of the drone, a direction at which the camera of the mobile terminal is facing and a direction at which the camera of the drone is facing.

Moreover, the option 4710 also provides an additional function capable of controlling a size of the map. FIG. 47 assumes that a full size is selected as the size of the map. Hence, a whole screen is changed to the map. On the contrary, if a mini size is selected as the size of the map, as shown in FIG. 48, at least one 4810 of a preview image outputted by the camera of the drone and a preview image outputted by the camera of the mobile terminal is displayed together with the map 4820.

Figure 49:
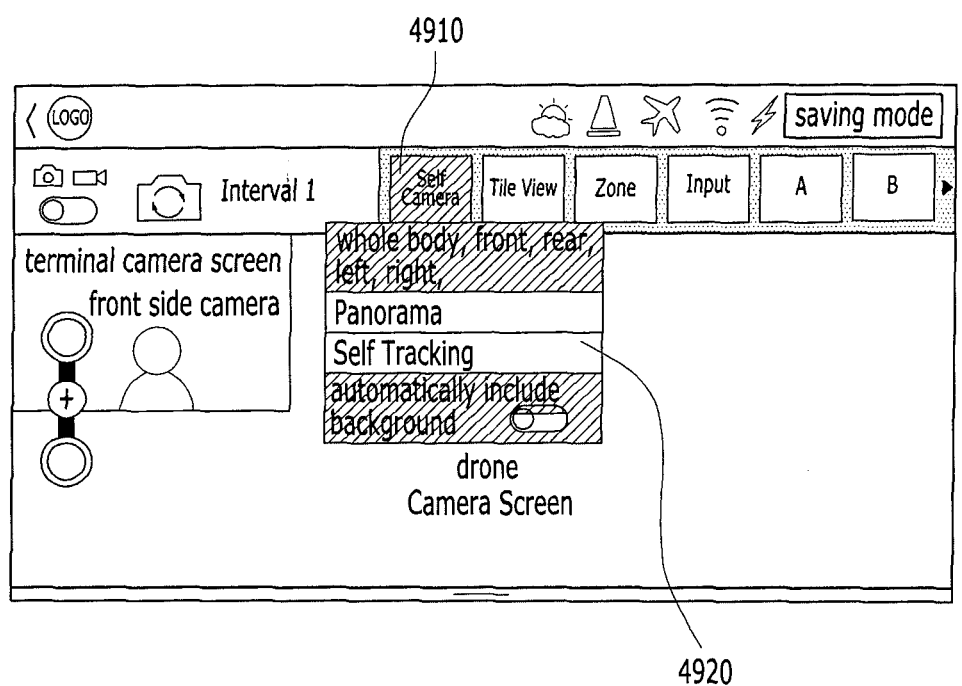
FIGS. 49 to 51 are diagrams for a process of controlling a camera of a mobile terminal and a camera of a drone to capture on the basis of a specific point using the mobile terminal according to a different embodiment of the present invention.
Figure 50:
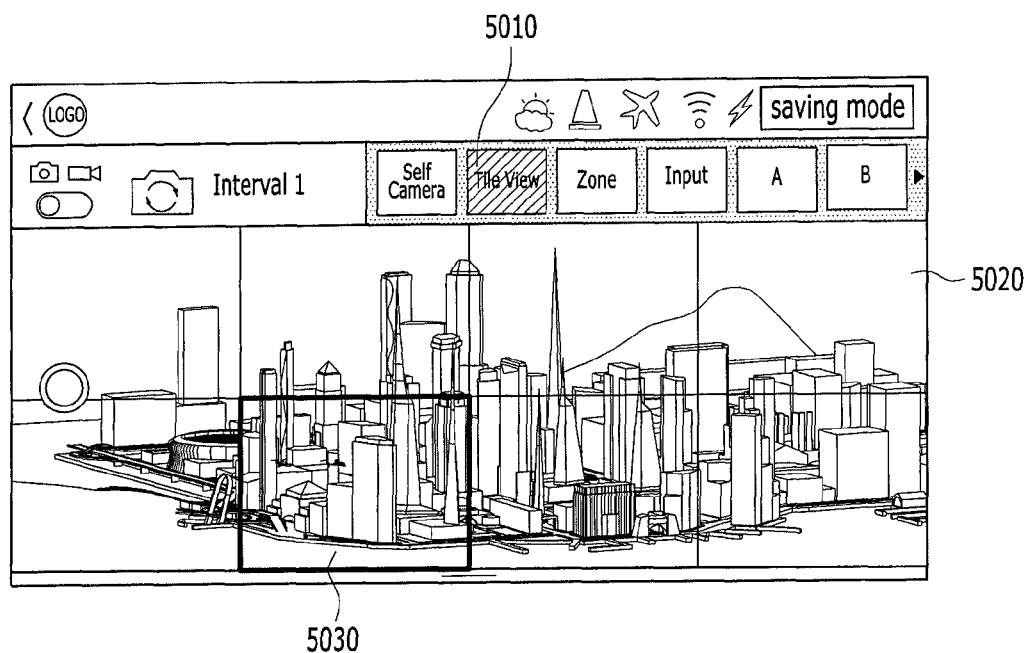
Figure 51:
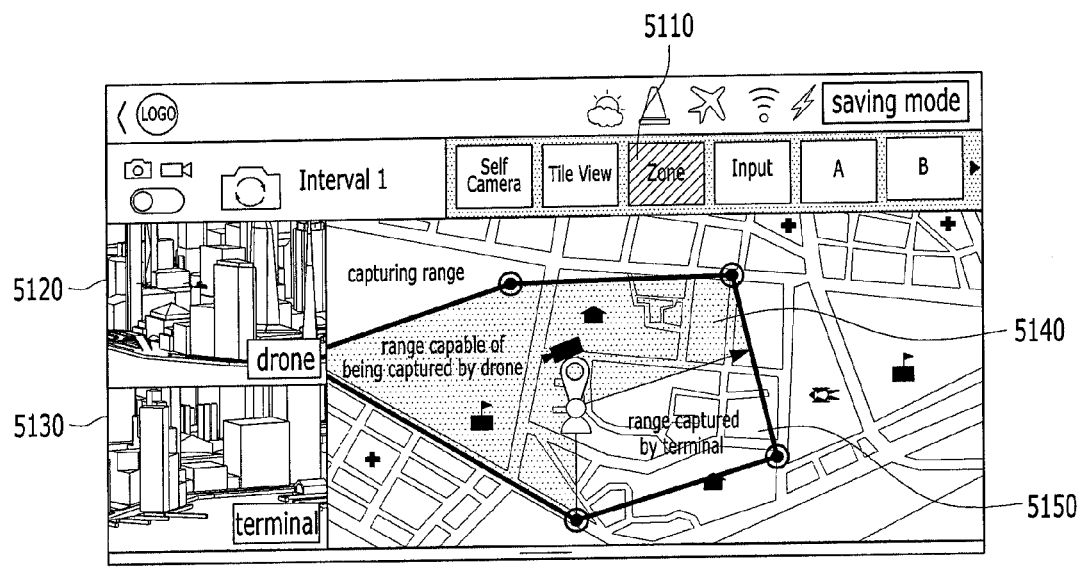

FIGS. 49 to 51 are diagrams for a process of controlling a camera of a mobile terminal and a camera of a drone to capture on the basis of a specific point using the mobile terminal according to a different embodiment of the present invention.

FIG. 49 shows an option 4910 related to a self-camera. A sub option configured to select a scheme for a drone to capture surroundings of a user carrying a mobile terminal is displayed. For instance, after the option 4910 is selected, the drone moves to a position in the vicinity of the mobile terminal and captures a direction identical to a direction at which the camera of the mobile terminal is facing or a direction opposite to the direction at which the camera of the mobile terminal is facing on a moment that a preview image is captured by the camera of the mobile terminal Of course, the mobile terminal should transmit at least one of location information and direction information of the mobile terminal to the drone to implement the aforementioned capturing scheme. For instance, the mobile terminal can transmit the location information to the drone at the moment of capturing the preview image or consistently transmit the location information to the drone. The above-mentioned description also belongs to the scope of right of the present invention.

Meanwhile, a panorama included in the sub option 4920 shown in FIG. 49 means a mode of the camera of the drone capturing the mobile terminal while rotating 360 degrees around of the mobile terminal A self-tracking included in the sub menu 4920 means a mode of the camera of the drone continuously tracking and capturing a position of the moving mobile terminal.

FIG. 50 shows an option related to a tile view 5010. A preview image 5020 obtained by a camera of a mobile terminal is displayed. In particular, as shown in FIG. 50, the preview image 5020 is divided into a plurality of areas.

If a touch input is recognized on a specific area 5030 among a plurality of the areas in the preview image, location information corresponding to the specific area is transmitted to the drone and a preview image obtained by a camera of the drone is displayed.

The preview image obtained by the camera of the drone is displayed on the specific area 5030 for example. In particular, the preview image obtained by the camera of the drone corresponds to an image captured at a relatively closer distance compared to the preview image obtained by the camera of the mobile terminal. Hence, while watching the preview image captured by the camera of the mobile terminal, if a user wants to capture a specific point in a manner of magnifying the specific point, the user may be able to indicate the drone to closely capture the specific point by simply touching a corresponding area (a tile).

FIG. 51 shows an option 5110 related to a zone. A first preview image 5130 corresponding to an area 5150 at which a camera of a mobile terminal is facing is displayed. In this case, although a user does not take a special action, if the option 5110 related to the zone is selected, the mobile terminal transmits location information and camera direction information to a drone. Hence, a second preview image 5120 corresponding to an area 5140 at which a camera of the drone is facing is displayed together with the first preview image. In particular, another characteristic of the present invention is to design the drone to automatically capture an area only where the camera of the mobile terminal is unable to cover.

For instance, the mobile terminal calculates an angle covered by the camera of the mobile terminal and transmits additional information related to the calculated angle to the drone. The additional information corresponds to a numerical value of the calculated angle or (360 degrees—the numerical value of the calculated angle) for example.

Figure 52:
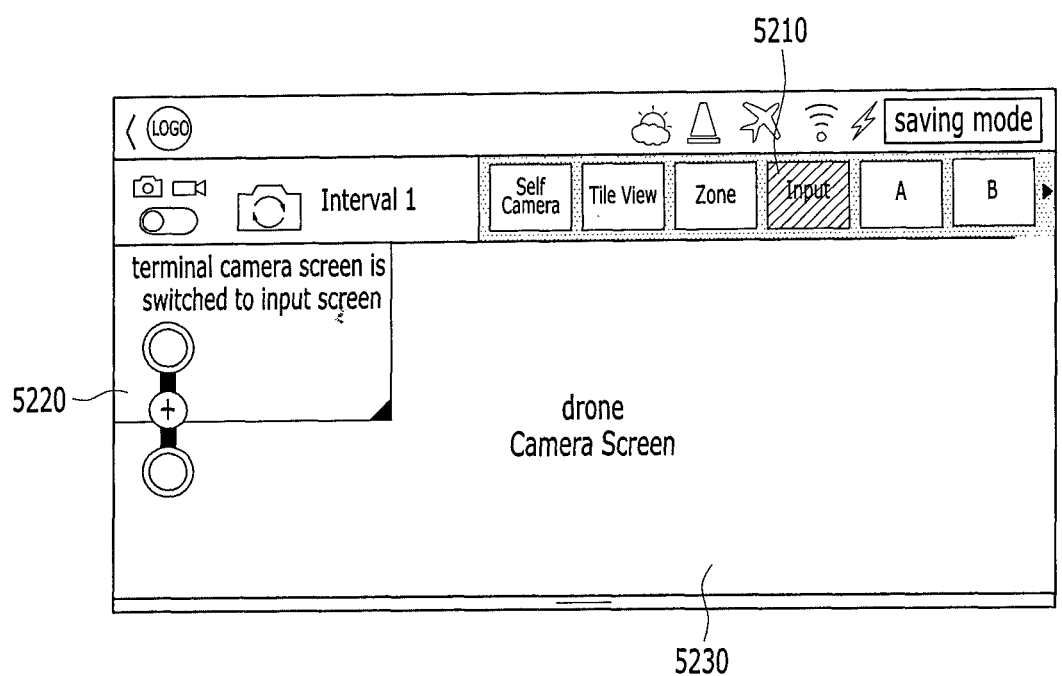
FIG. 52 is a diagram for a process of controlling a drone using various recognition modules of a mobile terminal according to a different embodiment of the present invention.

FIG. 52 is a diagram for a process of controlling a drone using various recognition modules of a mobile terminal according to a different embodiment of the present invention.

FIG. 52 shows an option 5210 related to an input. According to the previously explained drawings and embodiments, a preview image obtained by a camera of a drone is outputted on a first area 5230 and a preview image obtained by a camera of a mobile terminal is displayed on a second area 5220. Yet, in FIG. 52, the second area 5220 is defined by a different purpose. In particular, the second area 5220 is used to detect a specific part of a user.

For instance, the mobile terminal detects a specific part of a user included in the second area 5220 and transmits a command controlling a motion of the drone to the drone based on the detected specific part. The specific part of the user corresponds to at least one selected from the group consisting of a mouth, eyes and a hand of the user for example. Hence, gesture recognition or voice recognition rate can be enhanced.

Figure 53:
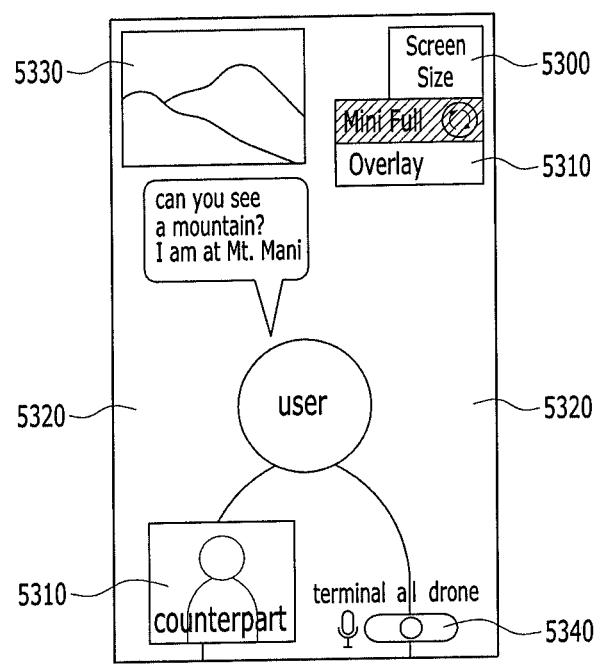
FIGS. 53 and 54 are diagrams for a process of outputting a camera of a drone, a camera of a mobile terminal and a camera of an external mobile terminal on a screen outputted by the mobile terminal according to a different embodiment of the present invention.
Figure 54:
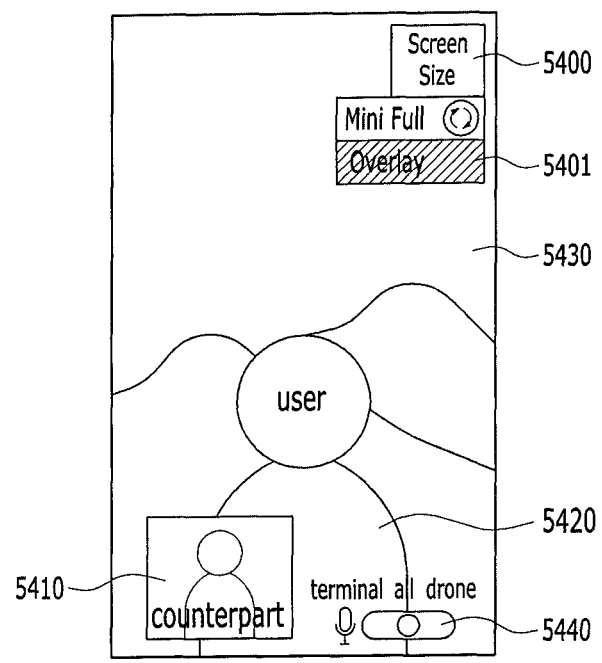

FIGS. 53 and 54 are diagrams for a process of outputting a camera of a drone, a camera of a mobile terminal and a camera of an external mobile terminal on a screen outputted by the mobile terminal according to a different embodiment of the present invention.

FIG. 53 and FIG. 54 assume a scene that a user is making a video call with a third party. First of all, as shown in FIG. 53, if mini/full 5310 is selected from an option 5300 controlling a screen size, a preview image obtained by a camera of a drone is outputted on a first area 5330 and a preview image obtained by a camera of a mobile terminal is outputted on a second area 5320. And, a video data transmitted via a mobile terminal of a counterpart, who has made a call or received a call, is displayed on a third area 5310. In this case, an option 5340 configured to transmit at least one of audio data obtained by the mobile terminal and audio data obtained by the drone to the mobile terminal of the counterpart is additionally displayed.

Unlike FIG. 53, FIG. 54 assumes a case that Overlay 5401 is selected from an option 5400 controlling a screen size. In this case, a preview image 5430 obtained by a camera of a drone and a preview image 5420 obtained by a camera of a mobile terminal are displayed in a synthesized form. And, similar to FIG. 53, a video data transmitted via a mobile terminal of a counterpart, who has made a call or received a call, is displayed on a third area 5410. And, similar to FIG. 53, an option 5440 configured to transmit at least one of audio data obtained by the mobile terminal and audio data obtained by the drone to the mobile terminal of the counterpart is additionally displayed.

Figure 55:
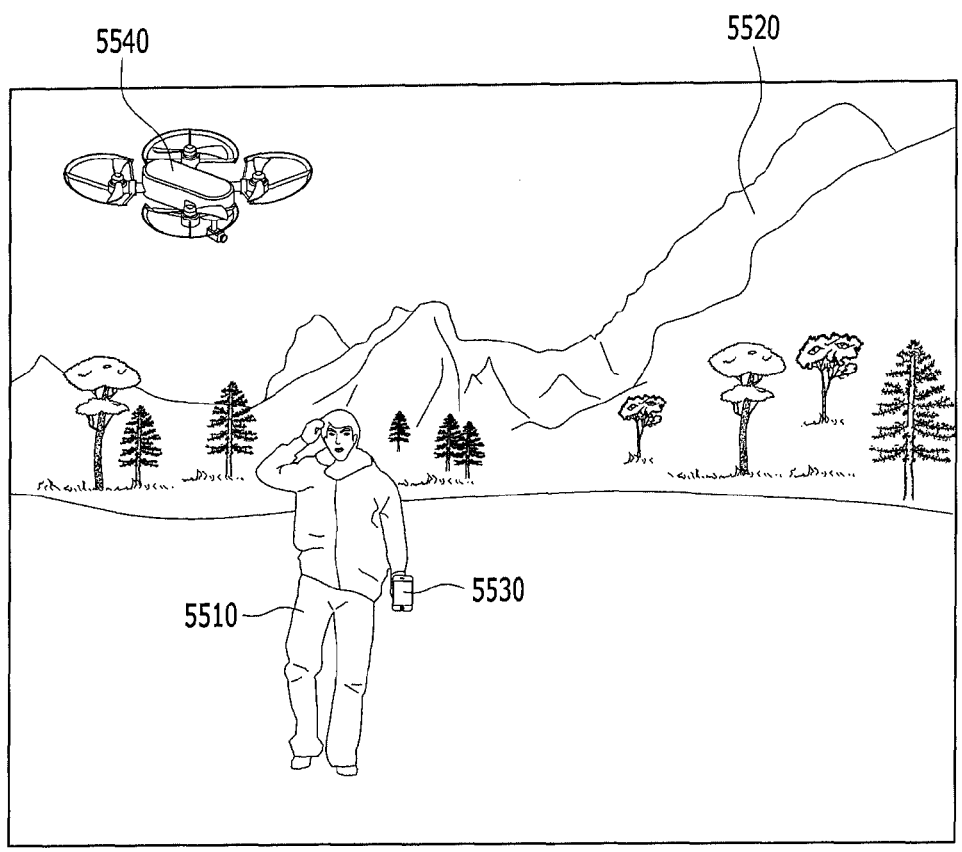
FIGS. 55 and 56 are diagrams for explaining an example of a process of capturing a preview using a camera of a mobile terminal and a camera of a drone, respectively, according to a different embodiment of the present invention.
Figure 56:
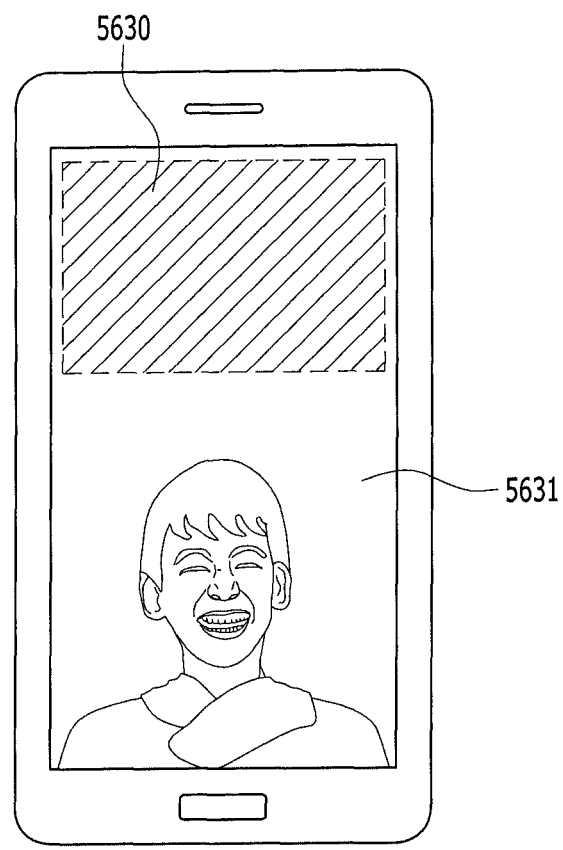

FIGS. 55 and 56 are diagrams for explaining an example of a process of capturing a preview using a camera of a mobile terminal and a camera of a drone, respectively, according to a different embodiment of the present invention.

As shown in FIG. 55, assume a case that a user 5510 carrying a mobile terminal 5530 is capturing a selfie with a mountain 5520 in the background. In this case, as shown in FIG. 56, unless a drone automatically moves to a specific point, the user 5631 and a partial area 5640 of the mountain are captured only. A further different embodiment of the present invention to solve the aforementioned problem is described with reference to FIG. 57 and FIG. 58 in the following.

Figure 57:
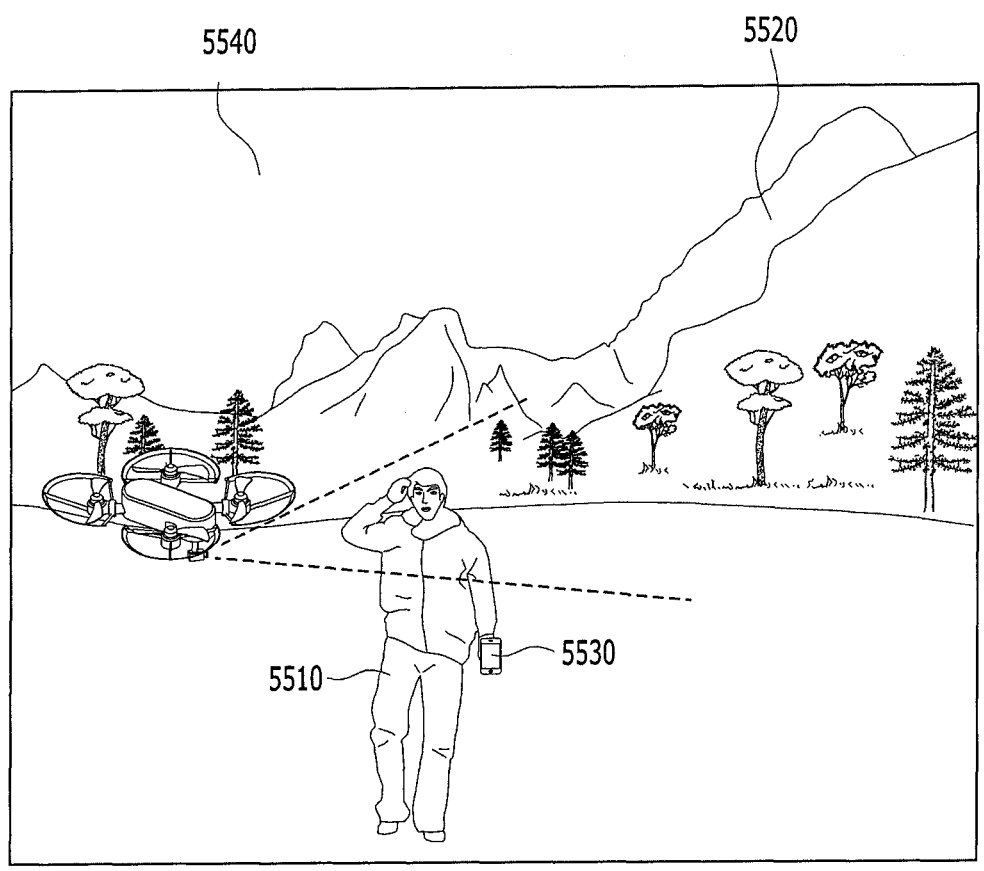
FIGS. 57 and 58 are diagrams for explaining a different example of a process of capturing a preview using a camera of a mobile terminal and a camera of a drone, respectively, according to a different embodiment of the present invention.
Figure 58:
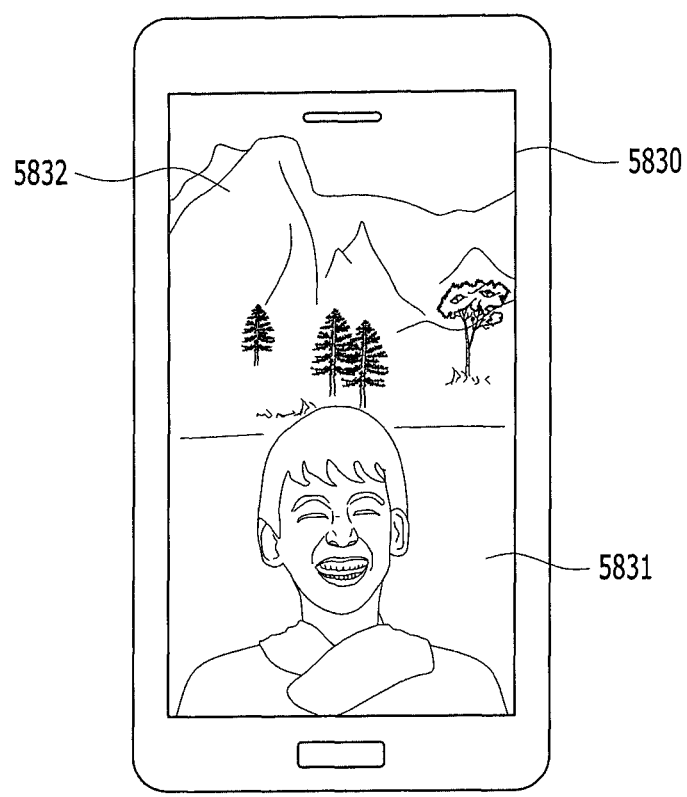

FIGS. 57 and 58 are diagrams for explaining a different example of a process of capturing a preview using a camera of a mobile terminal and a camera of a drone, respectively, according to a different embodiment of the present invention.

As shown in FIG. 57, assume a case that a user 5510 carrying a mobile terminal 5530 is capturing a selfie with a mountain 5520 in the background. In this case, unlike FIG. 55, a drone 5540 moves to a position in the vicinity of the mobile terminal 5530 and a camera of the drone is situated at a direction identical to a direction at which a camera of the mobile terminal 5530 is facing or a direction opposite to the direction at which the camera of the mobile terminal 5530 is facing. Hence, as shown in FIG. 58, a preview image including both the user 5831 and a whole area 5832 of the mountain is captured. By doing so, the user can obtain both a preview image closely captured by the camera of the mobile terminal and a preview image captured in a manner of being magnified by the camera of the drone in a short period of time.

To this end, the mobile terminal should transmit location information to the drone. This sort of process can be performed at a moment (e.g., a moment of pushing a camera shutter button of the mobile terminal) of capturing the preview image obtained by the camera of the mobile terminal or when a predetermined time elapses from the moment. As mentioned in the foregoing description, the location information corresponds to information on the direction identical to the direction at which the camera of the mobile terminal is facing or the direction opposite to the direction at which the camera of the mobile terminal is facing. More specifically, for instance, if a user makes the camera of the mobile terminal face at A direction, captures an image and turns around, the drone moves to a corresponding direction and the camera of the drone captures a preview image including the user again. Or, if the user makes the camera of the mobile terminal face at the A direction and captures an image, the drone moves in front of the user in prescribed time and the camera of the drone can capture a preview image including the user again.

The present invention mentioned in the foregoing description can be implemented by codes readable by a computer in media in which a program is recorded. Media readable by a computer includes all kinds of recording devices in which data readable by a computer system is stored. Examples of the media readable by a computer include a HDD (hard disk drive), an SSD (solid state disk), an SDD (silicon disk drive), a ROM, a RAM, a CD-ROM, a magnetic tape, a floppy disk, an optical data storing device and the like. And, the media can be implemented in a form of a carrier wave (e.g., transmission via the internet). And, the computer may include a controller 180 of a terminal. While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A method of communicating with a drone via a mobile terminal, the method comprising:
    calculating an angle of view covered by a camera of the mobile terminal;
    transmitting view information related to the calculated angle of view and location information of the mobile terminal to the drone via a communication module to cause the drone to capture another view via a camera of the drone wherein the another view is not included in the angle of view covered by the camera of the mobile terminal;
    designating a position of the drone based on the transmitted location information;
    receiving a first preview image from the drone, the first preview image corresponding to the another view and obtained via the camera of the drone from the designated position;
    displaying the first preview image on a first area of a touchscreen of the mobile terminal; and
    capturing the first preview image in response to a first touch input received via the touchscreen.

2. The method of claim 1, further comprising displaying a second preview image obtained via a camera of the mobile terminal on a second area of the touchscreen.

3. The method of claim 2, further comprising displaying an option to select:
a first mode for controlling the first preview image and the second preview image with a single indicator; or
a second mode for controlling the first preview image and the second preview image with two different corresponding indicators.

4. The method of claim 3, further comprising deactivating the first mode when a camera capturing mode of the drone is different from a camera capturing mode of the mobile terminal.

5. The method of claim 4, wherein the camera capturing mode of the drone and the camera capturing mode of the mobile terminal each comprise a video capturing mode or a picture capturing mode.

6. The method of claim 3, wherein:
the first preview image and the second preview image are simultaneously captured in response to an input to the single indicator in the first mode; and
the first preview image and the second preview image are individually captured in response to corresponding inputs to the two different corresponding indicators in the second mode.

7. The method of claim 2, further comprising transmitting object capture information to the drone for capturing an image of an object from a capturing position in response to receiving a selection of the object from the displayed second preview image.

8. The method of claim 7, wherein the object capture information comprises at least a distance between the capturing position and the object, a direction of the capturing position relative to the object, or a camera capturing scheme.

9. The method of claim 8, wherein the camera capturing scheme comprises at least a first scheme type for capturing an image of the object from a front view, a second scheme type for capturing the image while rotating 360 degrees around the object, or a third scheme type for capturing the image from above the object at an altitude higher than the object.

10. The method of claim 2, further comprising changing at least corresponding positions of the first area and the second area or corresponding sizes of the first area and the second area.

11. The method of claim 10, further comprising displaying an indicator of at least one specific area to which a position of the first area or the second area can be moved in response to a long touch input received via the touchscreen to the corresponding first area or second area, the long touch input received for longer than a threshold length of time.

12. The method of claim 2, further comprising displaying a third preview image received from an external mobile terminal on a third area of the touchscreen when a call signal is received from the external mobile terminal.

13. The method of claim 2, further comprising:
detecting a specific part of a user included in the second preview image; and
transmitting a command to the drone for controlling a motion of the drone based on detecting the specific part.

14. The method of claim 13, wherein the specific part comprises at least a mouth, eyes, or a hand of the user.

15. The method of claim 1, further comprising:
displaying a control for selecting a distance between the drone and the mobile terminal and direction information of the drone relative to the mobile terminal; and
transmitting the selected distance and direction information to the drone.

16. The method of claim 1, wherein the view information comprises a numerical value of the calculated angle of view.

17. The method of claim 1, further comprising displaying a position of the mobile terminal and a position of the drone on a map.

18. The method of claim 17, wherein the map comprises information indicating:
a path of movement of the mobile terminal;
a path of movement of the drone;
a direction a camera of the mobile terminal is facing; and
a direction a camera of the drone is facing.

19. The method of claim 1, further comprising displaying an option for selectively storing at least first audio data obtained via a microphone of the drone or second audio data obtained via a microphone of the mobile terminal.

20. The method of claim 1, wherein the location information is transmitted to the drone after the first preview image is captured or after a threshold length of time.

21. The method of claim 20, wherein the location information comprises information related to a direction the camera of the mobile terminal is facing.

22. The method of claim 1, further comprising:
dividing the first preview image or the second preview image into a plurality of sections; and
transmitting target location information related to a target location to the drone in response to a touch input received to a selected one of the plurality of sections via the touchscreen, wherein the selected one of the plurality of sections corresponds to the target location; and
receiving an updated preview image of the target location from the drone obtained via the camera of the drone.

23. The method of claim 22, further comprising displaying the updated preview image on the selected one of the plurality of sections.

24. The method of claim 23, wherein the updated preview image corresponds to an image of the target location captured at a closer distance compared to the first preview image or the second preview image.

25. A mobile terminal, comprising:
a touchscreen configured to display information;
a communication module configured to transmit and receive information; and
a controller configured to:
calculate an angle of view covered by a camera of the mobile terminal;
cause the communication module to transmit view information related to the calculated angle of view and location information of the mobile terminal to a drone to cause the drone to capture another view via a camera of the drone wherein the another view is not included in the angle of view covered by the camera of the mobile terminal;
designate a position of the drone based on the transmitted location information;
receive a first preview image from the drone via the communication module, the first preview image corresponding to the another view and obtained via the camera of the drone from the designated position;
cause the touchscreen to display the first preview image on a first area of the touchscreen; and
capture the first preview image in response to a first touch input received via the touchscreen.

26. The mobile terminal of claim 25, wherein the controller is further configured to cause the touchscreen to display a second preview image obtained via a camera of the mobile terminal on a second area of the touchscreen.

27. The mobile terminal of claim 26, wherein the controller is further configured to cause the touchscreen to display an option to select:
a first mode for controlling the first preview image and the second preview image with a single indicator; or
a second mode for controlling the first preview image and the second preview image with two different corresponding indicators.

28. The mobile terminal of claim 27, wherein the controller is further configured to deactivate the option for the first mode if a camera capturing mode of the drone is different from a camera capturing mode of the mobile terminal.

29. The mobile terminal of claim 28, wherein the camera capturing mode of the drone and the camera capturing mode of the mobile terminal each comprise a video capturing mode or a picture capturing mode.

30. The mobile terminal of claim 27, wherein:
the first preview image and the second preview image are simultaneously captured in response to an input to the single indicator in the first mode; and
the first preview image and the second preview image are individually captured in response to corresponding inputs to the two different corresponding indicators in the second mode.

31. The mobile terminal of claim 26, wherein the controller is further configured to cause the communication module to transmit object capture information to the drone for capturing an image of an object from a capturing position with respect to a location of the object in response to receiving a selection of the object from the displayed second preview image.

32. The mobile terminal of claim 31, the object capture information comprises at least a distance between the capturing position and the object, a direction of the capturing position relative to the object, or a camera capturing scheme.

33. The mobile terminal of claim 32, wherein the camera capturing scheme comprises at least a first scheme type for capturing an image of the object from the front, a second scheme type for capturing the image while rotating 360 degrees around the object, or a third scheme type for capturing the image from above the object at an altitude higher than the object.

34. The mobile terminal of claim 26, wherein the controller is further configured to change at least corresponding positions of the first area and the second area or corresponding sizes of the first area and the second area.

35. The mobile terminal of claim 34, the controller is further configured to cause the touchscreen to display an indicator of at least one specific area to which a position of the first area or the second area can be moved in response to a long touch input to the corresponding first area or second area, the long touch input received for longer than a threshold length of time.

36. The mobile terminal of claim 26, the controller is further configured to cause the touchscreen to display a third preview image received from an external mobile terminal on a third area of the touchscreen when a call signal is received from the external mobile terminal.

37. The mobile terminal of claim 26, wherein the controller is further configured to:
detect a specific part of a user included in the second preview image; and
cause the communication module to transmit a command to the drone for controlling a motion of the drone based on detecting the specific part.

38. The mobile terminal of claim 37, wherein the specific part comprises at least a mouth, eyes, or a hand of the user.

39. The mobile terminal of claim 25, wherein the controller is further configured to:
cause the touchscreen to display a control for selecting a distance between the drone and the mobile terminal and direction information of the drone relative to the mobile terminal; and
cause the communication module to transmit the selected distance and the direction information to the drone.

40. The mobile terminal of claim 25, wherein the view information comprises a numerical value of the calculated angle of view.

41. The mobile terminal of claim 25, wherein the controller is further configured to cause the touchscreen to display a position of the mobile terminal and a position of the drone on a map.

42. The mobile terminal of claim 41, wherein the map comprises information indicating:
a path of movement of the mobile terminal;
a path of movement of the drone;
a direction a camera of the mobile terminal is facing; and
a direction a camera of the drone is facing.

43. The mobile terminal of claim 25, wherein the controller is further configured to cause the touchscreen to display an option for selectively storing at least first audio data obtained via a microphone of the drone or second audio data obtained via a microphone of the mobile terminal.

44. The mobile terminal of claim 25, the controller is further configured to cause the communication module to transmit the location information to the drone after the first preview image is captured or after a threshold length of time.

45. The mobile terminal of claim 44, wherein the location information comprises information related to a direction the camera of the mobile terminal is facing.

46. The mobile terminal of claim 25, wherein the controller is further configured to:
cause the touchscreen to display the first preview image or the second preview image divided into a plurality of sections; and
causing the communication module to transmit target location information related to a target location to the drone in response to a touch input received to a selected one of the plurality of sections via the touchscreen, wherein the selected one of the plurality of sections corresponds to the target location; and
receive, via the communication module, an updated preview image of the target location from the drone obtained via the camera of the drone.

47. The mobile terminal of claim 46, wherein the controller is further configured to cause the touchscreen to display the updated preview image on the selected one of the plurality of sections.

48. The mobile terminal of claim 47, wherein the updated preview image corresponds to an image of the target location captured at a closer distance compared to the first preview image or the second preview image.

* * * * *